(12) United States Patent
Mangtani et al.

(10) Patent No.: US 7,787,262 B2
(45) Date of Patent: Aug. 31, 2010

(54) CAPACITOR CHARGING METHODS AND APPARATUS

(75) Inventors: Vijay Mangtani, Nashua, NH (US);
Nai-Chi Lee, Nashua, NH (US);
Tseng-Nan Tsai, Allentown, PA (US);
John Humenick, Lansdale, PA (US)

(73) Assignee: Allegro Microsystems, Inc., Worcester, MA (US)

( * ) Notice: Subject to any disclaimer, the term of this patent is extended or adjusted under 35 U.S.C. 154(b) by 437 days.

(21) Appl. No.: 11/612,564

(22) Filed: Dec. 19, 2006

(65) Prior Publication Data

US 2007/0103943 A1    May 10, 2007

Related U.S. Application Data

(63) Continuation-in-part of application No. 11/125,300, filed on May 9, 2005.

(51) Int. Cl.
*H02M 3/335* (2006.01)

(52) U.S. Cl. .................. 363/18; 363/20; 363/21.12; 363/56.09

(58) Field of Classification Search .................. 363/18, 363/19, 20, 21.12, 21.13, 56.09
See application file for complete search history.

(56) References Cited

U.S. PATENT DOCUMENTS

| | | |
|---|---|---|
| 5,068,575 A | 11/1991 | Dunsmore et al. |
| 5,377,091 A | 12/1994 | Faulk |
| 5,481,178 A | 1/1996 | Wilcox et al. |
| 5,485,361 A | 1/1996 | Sokal |
| 5,694,310 A | 12/1997 | Malik et al. |
| 5,731,694 A | 3/1998 | Wilcox et al. |

(Continued)

FOREIGN PATENT DOCUMENTS

JP    60154399 A    8/1985

(Continued)

OTHER PUBLICATIONS

Written Opinion and Search Report dated Dec. 8, 2008 for Singapore Patent Application No. 200717334-7, filed Oct. 31, 2007, prepared by the Australian Patent Office, 10 pages.

(Continued)

*Primary Examiner*—Bao Q Vu
*Assistant Examiner*—Nguyen Tran
(74) *Attorney, Agent, or Firm*—Daly, Crowley, Mofford & Durkee, LLP

(57) ABSTRACT

A capacitor charging circuit is provided with a primary side output voltage sensing circuit including an RC network having an RC time constant with a predetermined relationship to the RC time constant of the output capacitor. Once the capacitor voltage reaches a fully charged level, the charging mode is terminated. The output voltage is continuously detected by measuring the voltage across the primary side RC network that decays at a predetermined rate with respect to the output capacitor and the charging mode is commenced once the RC voltage falls to a predetermined level. According to a further aspect of the invention, a switch control circuit in a flyback converter controls the switch off time in response to detection of a change in the slope polarity of the voltage at a terminal of the switch.

11 Claims, 20 Drawing Sheets

U.S. PATENT DOCUMENTS

| | | | |
|---|---|---|---|
| 5,994,885 | A | 11/1999 | Wilcox et al. |
| 6,061,257 | A | 5/2000 | Spampinato et al. |
| 6,100,678 | A | 8/2000 | Hobrecht |
| 6,101,111 | A | 8/2000 | Blair |
| 6,144,194 | A | 11/2000 | Varga |
| 6,188,588 | B1 * | 2/2001 | Hemena et al. .......... 363/21.18 |
| 6,208,279 | B1 | 3/2001 | Oprescu |
| 6,304,066 | B1 | 10/2001 | Wilcox et al. |
| 6,307,356 | B1 | 10/2001 | Dwelley |
| 6,314,010 | B1 | 11/2001 | Markow et al. |
| 6,343,026 | B1 | 1/2002 | Perry |
| 6,356,466 | B1 * | 3/2002 | Smidt et al. .............. 363/21.17 |
| 6,445,598 | B1 * | 9/2002 | Yamada ................... 363/21.12 |
| 6,518,733 | B1 | 2/2003 | Schenkel et al. |
| 6,556,406 | B1 | 4/2003 | Matsunaga et al. |
| 6,580,258 | B2 | 6/2003 | Wilcox et al. |
| 6,636,021 | B2 | 10/2003 | Schenkel et al. |
| 6,674,247 | B1 | 1/2004 | Mead et al. |
| 6,674,274 | B2 | 1/2004 | Hobrecht et al. |
| 6,958,920 | B2 | 10/2005 | Mednik et al. |
| 2002/0190698 | A1 * | 12/2002 | Smidt et al. ................. 323/222 |
| 2004/0130299 | A1 | 7/2004 | Pietkiewicz et al. |
| 2004/0196669 | A1 | 10/2004 | Thrap |
| 2004/0196672 | A1 * | 10/2004 | Amei ......................... 363/20 |
| 2005/0024898 | A1 * | 2/2005 | Yang et al. ............... 363/21.12 |
| 2005/0073862 | A1 | 4/2005 | Mednik et al. |
| 2005/0094419 | A1 | 5/2005 | Chu et al. |
| 2006/0250824 | A1 | 11/2006 | Wekhande et al. |
| 2008/0030178 | A1 | 2/2008 | Leonard et al. |

FOREIGN PATENT DOCUMENTS

| | | |
|---|---|---|
| JP | 2000209854 A | 7/2000 |
| KR | 2004-14998 A | 2/2004 |
| WO | WO 03/065540 A2 | 8/2003 |
| WO | WO 03/065540 A3 | 8/2003 |
| WO | WO 2004/042906 | 5/2004 |

OTHER PUBLICATIONS

File downloaded from PAIR for U.S. Appl. No. 11/125,300, filed May 9, 2005, file from Nov. 10, 2008 through Apr. 17, 2009, 43 pages.

International Search Report (Form PCT/ISA/210) and Written Opinion of the International Searching Authority (Form PCT/ISA/237), for PCT/US2007/021932, Jul. 18, 2008, 12 pages.

Official Action from the Finland Patent Office in Finland Patent Application No. 20070841, dated May 7, 2008, Search Report, and English translation of the Official Action, 9 pages.

File downloaded from PAIR for U.S. Appl. No. 11/125,300, file Jan. May 9, 2005, 2006, filed through Nov. 21, 2008, 366 pages.

PCT Search Report and Written Opinion of the ISA for PCT/US2006/012615 dated Aug. 30, 2006.

Allegro Microsystems, Inc. Concept Datasheet A8424, "Photoflash Capacitor Charger with IGBT Driver for 2Li + Battery Input System", Feb. 16, 2005, 1-6 pages.

Allegro Microsystems, Inc. Concept Datasheet A8425, "High Current Photoflash Capacitor Charger with IGBT Driver for 2Li + Battery", Feb. 16, 2005, 1-7 pages.

Allegro Microsystems, Inc. Concept Datasheet A8436, "Photoflash Capacitor Charger with IGBT Driver", Mar. 30, 2005, 1-11 pages.

Allegro Microsystems, Inc. Concept Datasheet A8438, "Photoflash Capacitor Charger", Jul. 14, 2004, 1-3 pages.

Allegro Microsystems, Inc. Concept Datasheet A8439, "Photoflash Capacitor Charger", Jul. 14, 2004, 1-3 pages.

Linear Technology, Datasheet LT3420/LT3420-1, "Photoflash Capacitor Chargers with Automatic Refresh", 2002, 20 pages.

Linear Technology, Datasheet LT3468/LT3468-1, "Photoflash Capacitor Chargers in ThinSot", 2004, 12 pages.

Notification Concerning Transmittal of International Preliminary Report on Patentability (Chapter 1 of the Patent Cooperation Treaty); PCT/US2007/021932 dated Jul. 2, 2009, 7 pages.

Response to Written Opinion as filed on May 26, 2009 in Singapore, Application No. 200717334-7, 9 pages.

File downloaded from PAIR for U.S. Appl. No. 11/125,300, filed May 9, 2005, file from May 18, 2009 through Sep. 21, 2009, 48 pages.

Office Action from Taiwan dated Feb. 26, 2010 for TW95113802.

Korean Office Action for Korean Pat. App. No. 10-2007-7026332 dated Dec. 31, 2009 (w/English Translation).

* cited by examiner

CAPACITOR CHARGING METHODS AND APPARATUS

CROSS-REFERENCE TO RELATED APPLICATIONS

This application is a continuation-in-part application of U.S. patent application Ser. No. 11/125,300, filed on May 9, 2005, which is incorporated herein by reference.

STATEMENT REGARDING FEDERALLY SPONSORED RESEARCH

Not Applicable.

FIELD OF THE INVENTION

The invention relates to capacitor charging circuits and, more particularly to methods and apparatus for charging a camera photoflash capacitor.

BACKGROUND OF THE INVENTION

The use of conventional switch mode power supplies, or converter circuits, for charging capacitive loads, such as a camera photoflash capacitor, is known. U.S. Pat. No. 6,518,733 to Schenkel et al., entitled "Circuits and Techniques for Capacitor Charging Circuits," describes various features of such a circuit. For example, a switch control scheme is described in the '733 patent with which the main converter switch is controlled based on the transformer primary winding current and the secondary winding current. Specifically, the switch on time is controlled in response to the sensed primary winding current and the switch off time is controlled in response to the sensed secondary winding current. The above-referenced patent also describes sensing the converter output voltage from the primary side of the transformer with a comparator in order to determine when the capacitor is charged to the desired level. One-shot circuitry is used to disable the output of the comparator for an interval at the beginning of each off time of the switch since the voltage spikes occurring when the switch shuts off are not indicative of the actual output voltage. Also described is control circuitry to conserve power by ceasing the delivery of power to the capacitor load once the desired output voltage is reached. An interrogation timer activates the power delivery circuitry at a predetermined time after it has been deactivated in order to maintain the capacitor output load in a constant state of readiness. In some embodiments, the control circuitry disables both the power delivery circuitry and the measuring circuitry once the capacitor voltage is at the desired level in order to further reduce power dissipation.

In a related U.S. Patent Publication No. 2004/0130299, also entitled "Circuits and Techniques for Capacitor Charging Circuits," an alternative switch control scheme in described with which the main converter switch is controlled based on the transformer primary winding current and the primary winding voltage. Specifically, the switch on time is controlled in response to the sensed primary winding current and the switch off time is controlled in response to the sensed primary winding voltage.

SUMMARY OF THE INVENTION

According to the invention, a capacitor charging circuit having a transformer with a primary winding coupled to a switch and a secondary winding coupled to an output capacitor includes an RC network on the primary side of the transformer that has an RC time constant with a predetermined relationship to an RC time constant associated with the output capacitor. A control circuit is responsive to a regulation voltage provided across the RC network and provides an enable signal to enable a charging mode during which the switch is turned on and off to charge the output capacitor and to disable the charging mode. The predetermined relationship between the RC time constant of the RC network and the RC time constant associated with the output capacitor can be selected to achieve a desired output voltage regulation.

An attenuator coupled to the primary winding of the transformer provides an attenuated voltage proportional to a voltage across the primary winding. In some embodiments, a sample and hold circuit is coupled between the attenuator and the RC network to charge the RC network. In an alternative embodiment, a reference voltage is provided to charge the RC network. The control circuit includes a first comparator for providing a full charge indicator signal and a second comparator for providing a low charge indicator signal.

Also described is a method for maintaining the output capacitor in a substantially fully-charged condition that includes detecting the output voltage from the primary side of the transformer by measuring a voltage across an RC network that discharges at a rate that has a predetermined relationship to a rate of discharge of the output capacitor and commencing the charging mode of operation in response to the voltage across the RC network falling to a predetermined level. The charging mode of operation is terminated in response to the voltage across the RC network exceeding a second predetermined level that is greater than the first predetermined level.

With the above-described arrangements, the output voltage is detected based on a primary side reflection of the output voltage both as the output voltage increases during the charging mode, and also as the output voltage gradually decreases once the charging mode is terminated. Advantageously, the charging mode is not commenced unnecessarily since it is not commenced until detection of the output voltage dictates that the capacitor charge should be replenished.

According to a further aspect of the invention, a flyback converter includes a transformer having a primary winding and a secondary winding coupled to an output capacitor, a switch having a terminal coupled to the primary winding, and a switch control circuit having a first circuit portion for controlling the on time of the switch and a second circuit portion for controlling the off time of the switch, wherein the second circuit portion comprises a slope detection circuit to detect a change in the polarity of the voltage at the switch terminal.

In one particular embodiment, the slope detection circuit includes a sensing switch coupled to the switch terminal and having a control terminal, a clamp coupled to the control terminal, a resistor coupled to the control terminal, and a comparator coupled to the control terminal and providing a comparator output signal that transitions from a first logic level to a second logic level when the slope of the voltage at the switch terminal changes from a negative slope to a positive slope. In an alternative embodiment, the slope detection circuit includes a capacitor having a first terminal coupled to the switch terminal and a second terminal, a resistor coupled to the second terminal of the capacitor, and a comparator coupled to the second terminal of the capacitor and providing a comparator output signal that transitions from a first logic level to a second logic level when the slope of the voltage at the switch terminal changes from a negative slope to a positive slope. A clamp may be provided between the second terminal of the capacitor and ground, A further method of the invention, for use with a flyback converter having a transformer with a primary winding coupled to a switch and a secondary winding, includes detecting of a change in the polarity of the slope of a voltage at a terminal of the switch and turning the switch on in response to the detection.

With the above-described arrangements, the switch off time is controlled (i.e., the switch is turned on) in response to detection of a polarity change in the slope of the switch voltage $V_{SW}$ in order to implement a zero (or at least near zero) voltage switching scheme whereby the switch is turned on just as the switch voltage falls to zero volts, as is desirable to reduce switching losses.

BRIEF DESCRIPTION OF THE DRAWINGS

The advantages and aspects of the present invention will be more fully understood in conjunction with the following detailed description and accompanying drawings, wherein.

DETAILED DESCRIPTION

Figure 1:
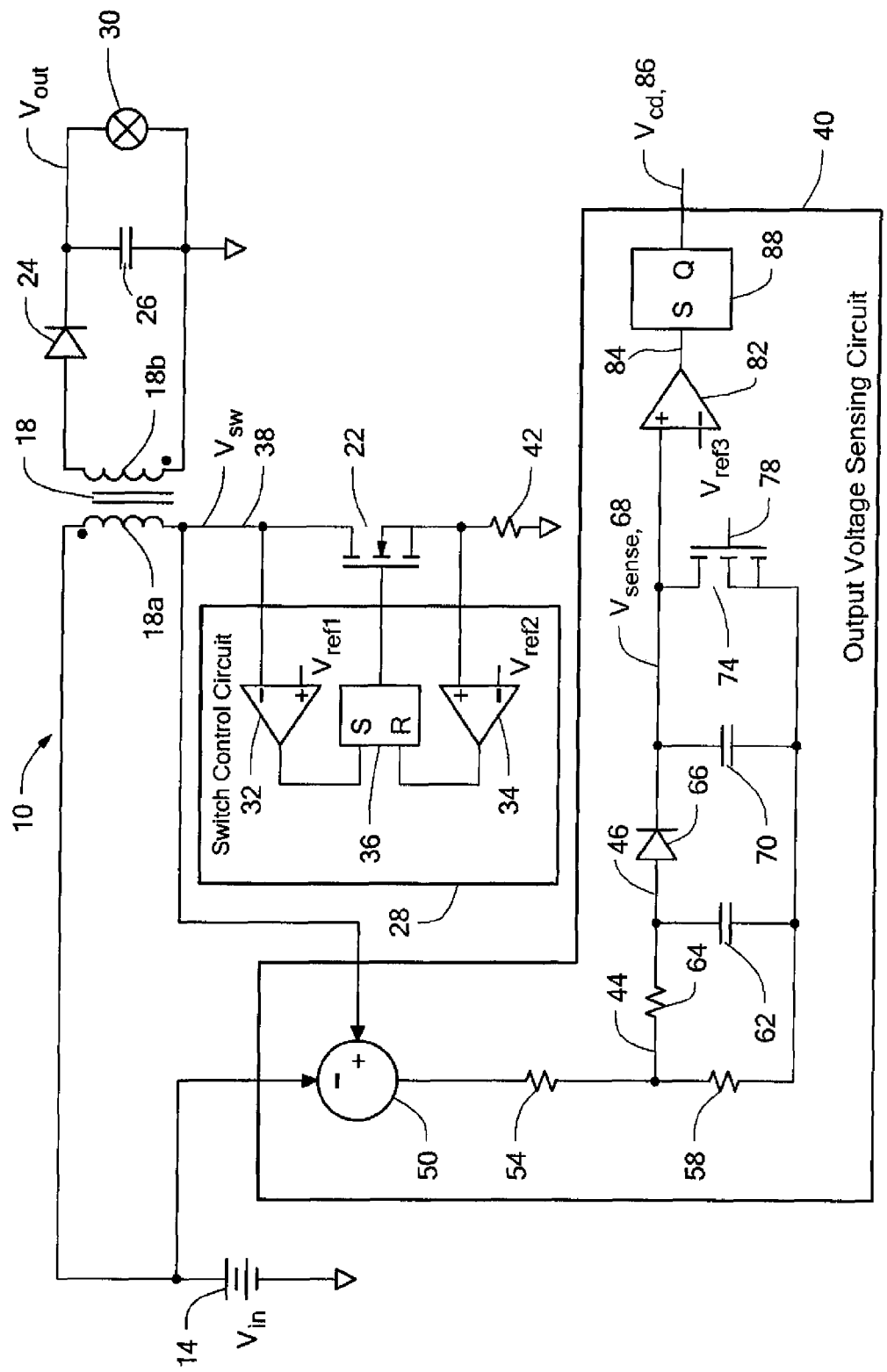
FIG. 1 is a schematic of a capacitor charging circuit having a primary side output voltage sensing circuit.

Referring to FIG. 1, a capacitor charging circuit 10 includes an input voltage source 14, a transformer 18 having a primary winding 18a and a secondary winding 18b, a main switch 22, a diode 24, and an output capacitor 26, coupled as shown, to supply power to a load 30. The circuit 10 has a flyback topology. The load 30, in the illustrative embodiment, is a camera photoflash and thus, the circuit 10 may be referred to as a photoflash charger or charging circuit. Typical photoflash voltage requirements are on the order of 300 volts. The input voltage source 14 may, for example, be a battery, such as an Alkaline, NiMH, or Lithium battery, providing a voltage in the range between approximately 1.8 and 5.0 volts in the illustrative embodiment.

In operation, when the switch 22 is on, energy is stored in the primary winding 18a of the transformer. During this time, the diode 24 is reverse-biased and no current is delivered to the output capacitor 26. When the switch turns off, the diode 24 becomes forward-biased and energy is transferred from the transformer secondary winding 18b to the output capacitor 26.

The capacitor charging circuit 10 includes a switch control circuit 28 for generating a control signal for the switch 22 which may be a MOSFET device. The control signal causes the switch to turn on and off until the output voltage Vout across the capacitor 26 reaches a desired level, such as 300 volts in the illustrated embodiment, preferably at an adaptive rate rather than at a fixed frequency. Once the output voltage Vout reaches the desired level, an indication is typically provided to the camera user that the photoflash 30 may be activated. When the user activates the photoflash 30, energy is transferred from the output capacitor 26 to the load.

The switch control circuit 28 includes a first comparator 32 having an inverting input coupled to the switch voltage Vsw at node 38 and a non-inverting input responsive to a reference voltage Vref1. A flip-flop, or latch 36 has a set input provided by the output signal of comparator 32. A second comparator 34 has a non-inverting input coupled to a resistor 42 provided to sense the primary winding current and an inverting input responsive to a reference voltage Vref2. The output of comparator 34 is coupled to the reset input of latch 36. The output of latch 36 is coupled to the gate of switch 22, as shown.

In operation, the on time portion of each switch cycle is controlled by the primary winding current level as sensed by resistor 42. In particular, when the primary winding current reaches a predetermined level, as established by reference voltage Vref2, the output of comparator 34 goes high, thereby resetting the latch 36 and causing the switch control signal to go low to shut off the switch 22. The reference voltage level Vref2 is selected (and in fact, may be user selectable) in order to provide a particular input current limit. When the switch voltage Vsw falls to the level of reference voltage Vref1, the output of comparator 32 goes high causing the latch output to go high and turn on switch 22.

The reference voltage Vref1 provided to comparator 32 is selected in order to cause the switch 22 to turn on once the secondary current has become discontinuous (i.e., passed through zero amps) in order to have the circuit operate near the continuous/discontinuous boundary, thereby achieving high flyback conversion efficiency. The level of the reference voltage Vref1 does not correlate to any particular secondary current level, but is selected only to ensure that the output of comparator 32 transitions only after the secondary current becomes discontinuous. In fact, the secondary current level occurring when the switch voltage Vsw reaches the level of reference voltage Vref1 will depend on various factors, including the transformer leakage inductance and parasitic capacitance.

It will be appreciated by those of ordinary skill in the art that various alternative schemes for controlling the switch 22 are possible. For example, the above-referenced U.S. Pat. No. 6,518,733 describes a switch control scheme in which the switch on time is controlled in response to sensed primary winding current and the off time is controlled in response to sensed secondary winding current. A further alternative scheme, in which the on time is controlled in response to the primary winding current and the off time is controlled in response to sensed output capacitor current, is described below in conjunction with FIGS. 4 and 5.

According to one aspect of the invention, the charger 10 includes an output voltage sensing circuit 40 for sensing the converter output voltage Vout from the primary side of the transformer, as is desirable in order to avoid the high power dissipation generally associated with secondary side voltage sensing in high output voltage circuits. The output voltage sensing circuit 40 includes a summing element 50, a level shifter in the form of a resistor divider comprising resistors 54 and 58, a resistor 64 and capacitor 62 for averaging the level-shifted switch voltage Vsw over a cycle during the off time of switch 22, a diode 66 and capacitor 70 for sampling and holding the filtered signal, and a switch 74, all coupled as shown.

The summing element 50 has a non-inverting input coupled to the circuit node 38, an inverting input coupled to the input voltage source Vin, and an output coupled to resistor 54. The voltage at the junction of resistors 54 and 58 (i.e. at circuit node 44) is proportional to the output voltage Vout when the switch 22 is off. The voltage at circuit node 44 is averaged by resistor 64 and capacitor 62 in order to eliminate the effect of voltage spikes occurring at the circuit node 38 when the switch 22 turns off. The voltage spikes are attributable to current ringing through the transformer leakage inductance and the parasitic capacitance of the switch 22. The filtered voltage at circuit node 46 is sampled and held by diode 66 and capacitor 70 to provide a DC voltage, Vsense, that is proportional to the output voltage Vout when the switch 22 is off and that is unaffected by the voltage spikes occurring at circuit node 38 when the switch 22 turns off. Thus, components 64 and 62 (and also capacitor 70) function to filter or waveshape the voltage at node 44 so that the Vsense voltage in an accurate indication of the output voltage Vout, having eliminated the affects of the leakage inductance ringing and the resulting voltage spikes on the switch voltage Vsw. It will be appreciated by those of ordinary skill in the art that resistor 64 may be realized as a combination of resistors 54 and 58.

The Vsense voltage is coupled to a comparator 82 for comparison to a reference voltage, Vref3, to provide a control signal 84 that is indicative of whether the output voltage Vout has reached a desired, fully charged level. The control signal 84 sets a latch 88, the output of which provides a "charge done" signal Vcd, 86 in the form of a pulse to indicate a fully charged capacitor condition only in response to one edge of the control signal 84, such as the rising edge as illustrated. The reference voltage Vref3 is selected so that the Vsense voltage exceeds the reference voltage when the output voltage Vout reaches the desired level.

In one illustrative embodiment, the charger 10 shuts down when the charge done signal Vcd indicates that the output voltage has reached the desired level. It will be appreciated that other appropriate action may be taken in response to the charge done signal Vcd, such as implementing a refresh feature described in the above-referenced U.S. Pat. No. 6,518,733.

The values of the resistor 64 and capacitors 62 and 70 are selected to average the level-shifted switch voltage at node 44 so as to remove at least the majority of the voltage spikes that occur when the switch turns off. Additional factors to consider when selecting the value of the filter components include the nominal output voltage level, the level of reference voltage Vref13, the turns ratio of the transformer, and whether the components are discrete or incorporated in an integrated circuit (since in the later case, keeping capacitor values small is critical) to name a few. In one illustrative embodiment, the RC time period due to resistors 54, 58, 64 and the parallel combination of capacitors 62 and 70 to reach Vref3 is selected to be on the order of one-quarter of the nominal switch off time.

The sample and hold diode 66 and capacitor 70, referred to alternatively as a peak charging circuit, may be eliminated depending on the speed of the comparator 82. If the comparator 82 is fast enough, the time varying smoothed signal at node 46 may be coupled directly to the comparator input. In the preferred embodiment however, peak charging elements 66 and 70 are used to provide the DC Vsense voltage to the input of comparator 82, as shown.

A switch 74, such as may be a MOSFET device for example, is coupled in parallel with capacitor 70, as shown. Switch 74 is turned on by a control signal 78, thereby discharging capacitor 70, whenever either one of the following conditions occur: (1) the photoflash 30 is activated; or (2) the output voltage Vout reaches the desired level, as determined by the Vsense voltage exceeding the reference voltage Vref3.

Figure 1A:
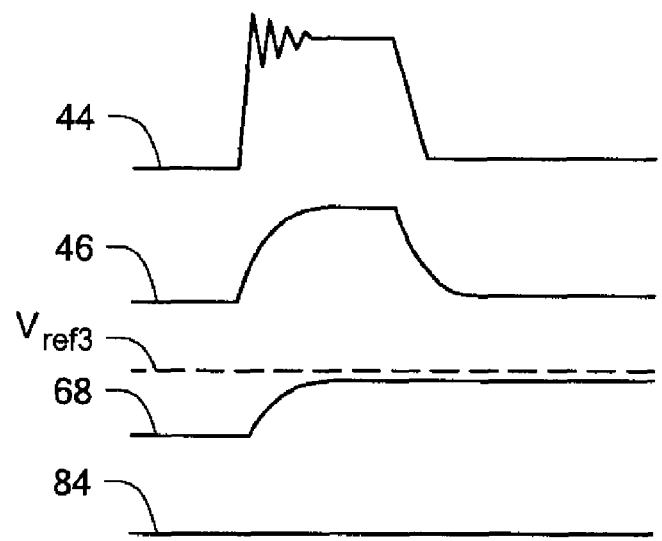
FIG. 1A shows several waveforms associated with the charging circuit of FIG. 1 when the output voltage has not yet reached the desired level.

Referring also to FIG. 1A, various waveforms are shown to illustrate operation of voltage sensing circuit 40 when the output voltage Vout has not reached the desired level. Waveform 44 shows the level-shifted switch voltage at circuit node 44, waveform 46 shows the filtered voltage at circuit node 46, and waveform 68 shows the peak charged Vsense voltage at node 68. Also shown is the reference voltage Vref3 being greater than the Vsense voltage 68, thereby indicating that the output voltage Vout has not yet reached the desired level. Thus, the control signal 84 at the output of comparator 82 remains at a logic low level.

Figure 1B:
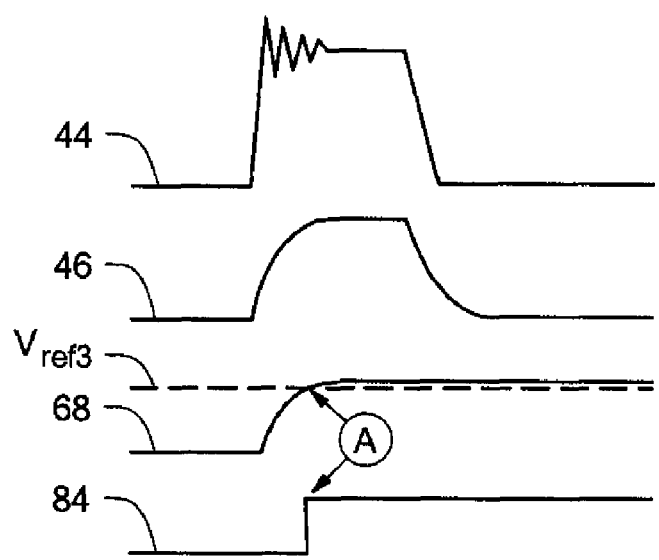
FIG. 1B shows several waveforms associated with the charging circuit of FIG. 1 when the output voltage has reached the desired level.

Referring also to FIG. 1B, the same waveforms as in FIG. 1A are shown. Here however, the output voltage Vout has reached the desired level, as indicated by the Vsense voltage 68 exceeding the Vref3 voltage at time A. Thus, the control signal 84 transitions to a logic high level at time A, as shown.

Figure 2:
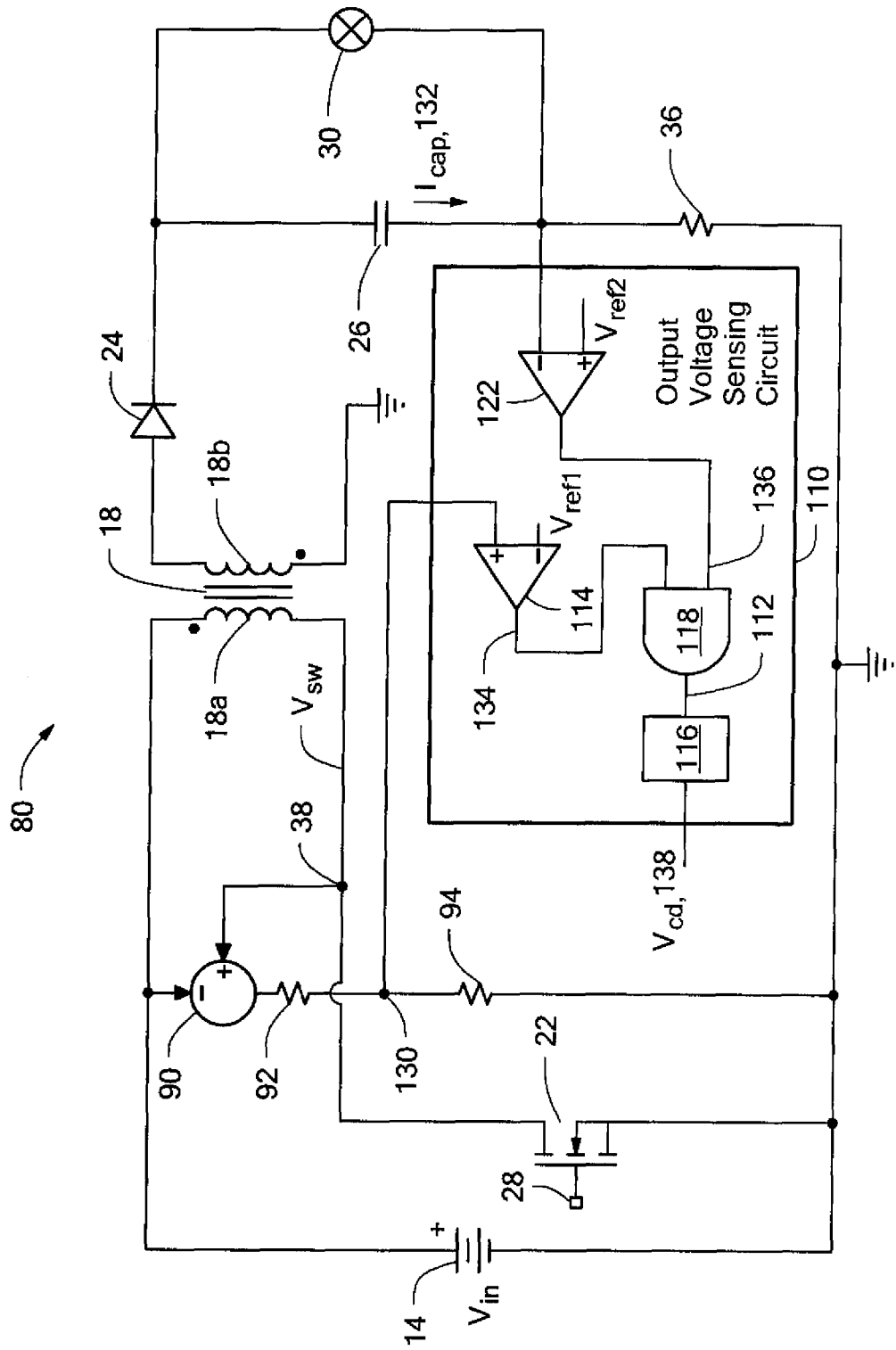
FIG. 2 is a schematic of an alternative embodiment of the capacitor charging circuit of FIG. 1 having an alternative primary side output voltage sensing circuit.

Referring to FIG. 2, an alternative capacitor charging circuit 80 is shown, in which like reference numbers refer to like elements. Circuit 80 thus includes input voltage source 14, transformer 18, switch 22, switch control circuit 28 (here simplified for ease of illustration), diode 24, and output capacitor 26. The charging circuit 80 differs from the charger 10 of FIG. 1 in that circuit 80 includes an alternative output voltage sensing circuit 110 with which the converter output voltage Vout is sensed from the primary side of the transformer.

Circuit 80 also includes a resistor 36 coupled in series between the output capacitor 26 and ground for sensing the current Icap, 132 through the output capacitor 26. The voltage across the resistor 36 is proportional to the capacitor current Icap. The capacitor current Icap is sensed for use by the output voltage sensing circuit 110, as will be described.

The output voltage sensing circuit 110 includes a summing element 90 and a level shifter in the form of a resistor divider comprising resistors 92 and 94. The summing element 90 has a non-inverting input coupled to the circuit node 38, an inverting input coupled to the input voltage source Vin, and an output coupled to resistor 92. The voltage at the junction of resistors 92 and 94 (i.e., at node 130) is proportional to the output voltage Vout when the switch 22 is off.

The output voltage sensing circuit 110 also includes a first comparator 114 having a non-inverting input coupled to node 130 at the junction of resistors 92 and 94 and an inverting input responsive to a reference voltage Vref1. The output signal 134 of comparator 114 is coupled to an input of an AND gate 118. Comparator 114 senses when the output voltage Vout reaches a desired level. Thus, reference voltage Vref1 is selected to correspond, via the transformer turns ratio and resistor divider ratio (of resistors 92 and 94), to desired fully charged capacitor voltage. In one illustrative embodiment, the desired output voltage is 300 volts and the reference voltage Vref1 is 5 volts or Vin.

A second comparator 122 has an inverting input coupled to the current sense resistor 36, a non-inverting input responsive to a reference voltage Vref2, and provides an output signal 136 coupled to an input of AND gate 118, as shown. Comparator 122 senses when the capacitor current Icap, 132 becomes very small, for example about 10% of its peak value. To this end, the reference voltage Vref2 is generally at several tens of milliamps multiplied by the resistance of resistor 36 above ground to account for propagation delay or other non-ideal effects.

The output signal 112 of AND gate 118 provides a control signal that indicates that the output voltage Vout has reached the desired level when both of the following conditions are true: the output voltage Vout has reached the desired voltage level as established by reference voltage Vref1 and the output capacitor is fully charged for a given switch cycle as determined by the capacitor current becoming discontinuous as sensed by resistor 36. In particular, the control signal 112 is high only when the output of both comparator 114 and comparator 122 are high. The control signal 112 sets a latch 116, the output of which provides a charge done signal Vcd, 138 in the form of a pulse at each rising edge of the control signal 112, such as may be used to shut down the charger 80.

Figure 2A:
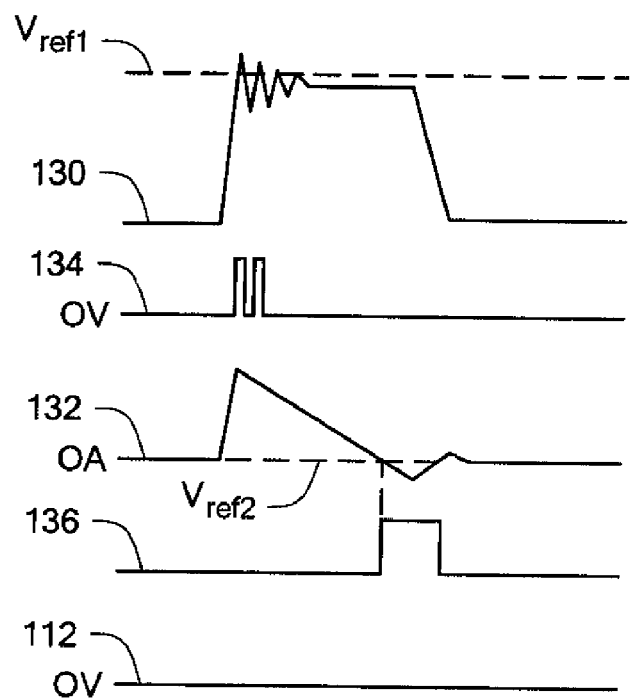
FIG. 2A shows several waveforms associated with the charging circuit of FIG. 2 when the output voltage has not yet reached the desired level.

Referring also to FIG. 2A, several waveforms associated with the circuit 80 are shown to illustrate operation of the voltage sensing circuit 110 when the output voltage Vout has not reached the desired level. In particular, waveform 130 shows the level-shifted switch voltage at node 130 and waveform 132 shows the capacitor current Icap. Waveform 134 shows the output signal of comparator 114, waveform 136 shows the output signal of comparator 122, and waveform 112 shows the control signal 112 at the output of AND gate 118.

Also shown is the reference voltage Vref1 being greater than the level-shifted switch voltage 130 once the voltage spikes occurring when the switch 22 turns off have dissipated, thereby indicating that the output voltage Vout has not yet reached the desired level. However, some of the peaks of the voltage spikes do exceed the reference voltage Vref1 and thus, the output signal 134 of comparator 114 transitions accordingly, as shown. When the capacitor current 132 becomes very small, the output signal 136 of comparator 122 goes high. However, since the output signal 134 of comparator 114 is low, the control signal 112 remains low, as is desired since the output voltage Vout has not reached the desired level.

Figure 2B:
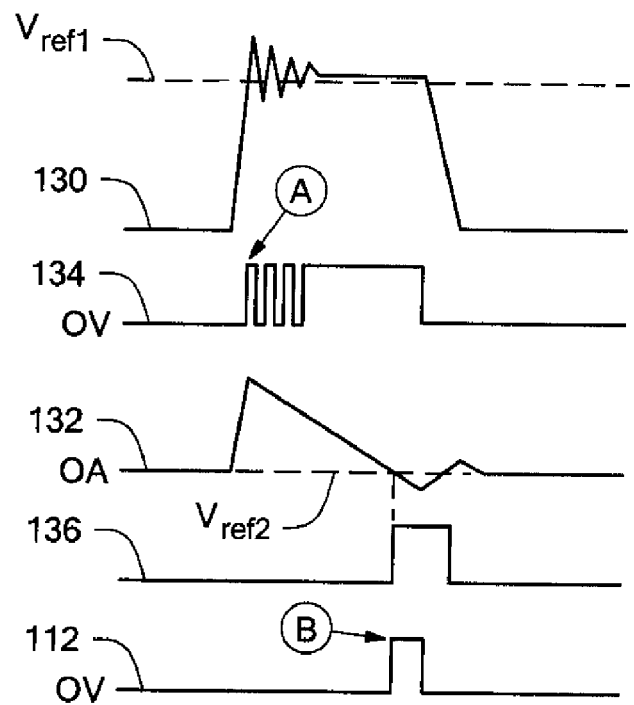
FIG. 2B shows several waveforms associated with the charging circuit of FIG. 2 when the output voltage has reached the desired level.

Referring also to FIG. 2B, the same waveforms as in FIG. 2A are shown. Here however, the output voltage has reached the desired level as indicated by the switch voltage 130 exceeding the reference voltage Vref1. Thus, the output signal 134 of comparator 114 transitions in response to the voltage spikes at time A and then stays high once the voltage spikes have dissipated. At a later time, here time B, the capacitor current Icap 132 reduces to small value such that the output signal 136 of comparator 122 goes high. Since the output signal 134 of comparator 114 is also high at time B, the output signal 112 of the AND gate 118 goes high, as shown.

With this arrangement, the voltage spikes that typically occur on the switch voltage Vsw when switch 22 turns off are prevented from affecting the control signal 112 and the charge done signal Vcd, 138. This is because, the control signal 112 can go high, indicating that the output voltage has reached the desired level, only when the capacitor current becomes very small, by which time the ringing causing the voltage spikes will have dissipated. Thus, even if the voltage spikes on the switch voltage 130 cause the output signal 134 of comparator 114 to go high when the output voltage has not reached the desired level, the control signal 112 will not go high since the capacitor current 132 will not have reached the desired small value.

It will be appreciated that while the circuit 110 is responsive to the voltage across resistor 36, other schemes for sensing the output capacitor current, or the secondary winding current may be used to provide an input to comparator 122 in order to determine when the capacitor current reduces to a desired small value.

Figure 3:
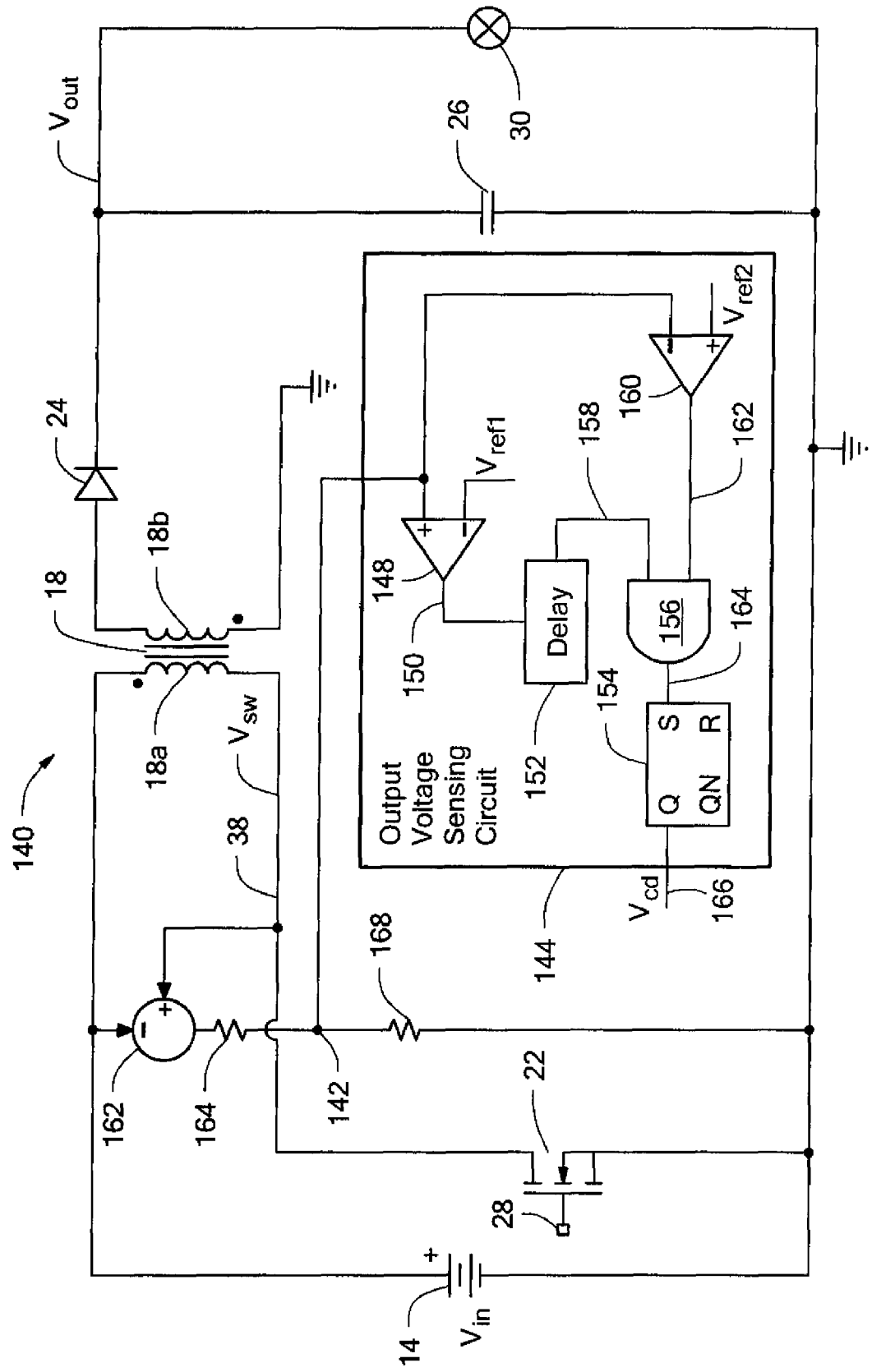
FIG. 3 is a schematic of a still further alternative embodiment of the capacitor charging circuit of FIG. 1 having a further alternative primary side output voltage sensing circuit.

Referring to FIG. 3, an alternative capacitor charging circuit embodiment 140 is shown, in which like reference numbers refer to like elements. Circuit 140 thus includes input voltage source 14, transformer 18, switch 22, switch control circuit 28 (again, simplified for ease of illustration), diode 24, and output capacitor 26. Circuit 140 differs from the charger 80 of FIG. 2 in that circuit 140 includes a further alternative output voltage sensing circuit 144. Like the output voltage sensing circuits 40 and 110 of FIGS. 1 and 2, respectively, circuit 144 senses the output voltage from the primary side of the transformer 18 in a manner that ensures that incorrect sensing does not occur in response to voltage spikes occurring on the switch voltage Vsw when switch 22 turns off.

Output voltage sensing circuit 144 includes a summing element 162 and a level shifter in the form of a resistor divider comprising resistors 164 and 168. The summing element 162 has a non-inverting input coupled to the circuit node 38, an inverting input coupled to the input voltage source Vin, and an output coupled to resistor 164. The voltage at the junction of resistors 164 and 168 (i.e., at node 142) is proportional to the output voltage Vout when the switch 22 is off.

The output voltage sensing circuit 144 further includes and a first comparator 148 having a non-inverting input coupled to node 142 at the junction between resistors 164 and 168, an inverting input adapted to receive a reference voltage Vref1, and provides an output signal 150. The reference voltage Vref1 is selected to correspond, via the transformer turns ratio, to a desired fully-charged level for the output voltage Vout. In one illustrative embodiment, the desired output voltage is 300V and the reference voltage Vref1 is equal to 5 volts or Vin. The comparator output signal 150 is coupled to a delay element 152 that delays the comparator output signal to provide delayed signal 158 to an AND gate 156.

A second comparator 160 has an inverting input coupled to node 142 at the junction between resistors 164 and 168, a non-inverting input adapted to receive a second reference voltage Vref2, and provides an output signal 162 to a second input of AND gate 156, as shown. The output signal 164 of AND gate 156 provides a control signal 164 that indicates that the output voltage Vout has reached the desired level when both of the following conditions are true: (a) a delay has occurred since the output voltage Vout has reached the desired level as established by reference voltage Vref1 and (b) the capacitor 26 is fully charged for a given switch cycle as is established by the combination of delay element 152 and reference voltage Vref2, as will become apparent from consideration of FIGS. 3A and 3B. The control signal 164 sets a latch 154, the output of which provides a "charge done" signal Vcd, 166 in the form of a pulse to indicate a fully charged capacitor condition only in response to one edge of control signal 164, such as the rising edge. In one illustrative embodiment, the charger 140 shuts down when the charge done signal Vcd, 166 goes high indicating that the capacitor 26 is fully charged.

Figure 3A:
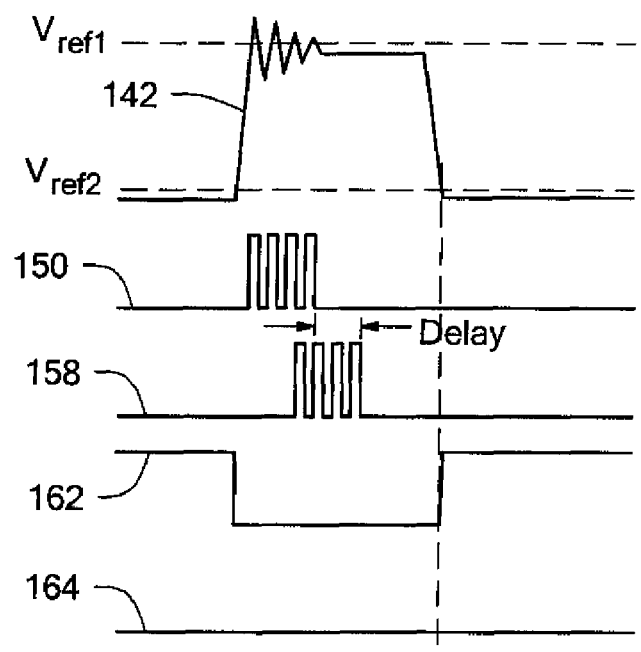
FIG. 3A shows several waveforms associated with the charging circuit of FIG. 3 when the output voltage has not yet reached the desired level.

Referring to FIG. 3A, certain waveforms associated with the circuit 140 are shown to illustrate operation of the voltage sensing circuit 144 when the output voltage Vout has not reached the desired level. Waveform 142 shows the level-shifted switch voltage VSW at node 142 in relation to the reference voltages Vref1 and Vref2. Waveform 150 shows the output signal of comparator 148, waveform 158 shows the output signal of delay element 152, waveform 162 shows the output signal of comparator 160 and waveform 164 shows the control signal at the output of AND gate 156.

In operation, when the level-shifted switch voltage at node 142 reaches the level of reference voltage Vref1, comparator output signal 150 goes high. Here, even though the output voltage Vout has not reached the desired level, the voltage spikes occurring at node 142 when the switch turns off cause the output signal 150 of comparator 148 to transition several times, as shown.

Once the level-shifted switch voltage at node 142 falls to below the second reference voltage Vref2, the output signal 162 of comparator 160 goes high, as shown. Only when both the delayed signal 158 and the comparator output signal 162 are high does the output signal 164 of AND gate 156 go high. Here, since the delayed signal 158 and the comparator output signal 162 are not both high at the same time, the control signal 164 remains low, thereby accurately indicating that the output voltage Vout has not reached the desired voltage level.

Figure 3B:
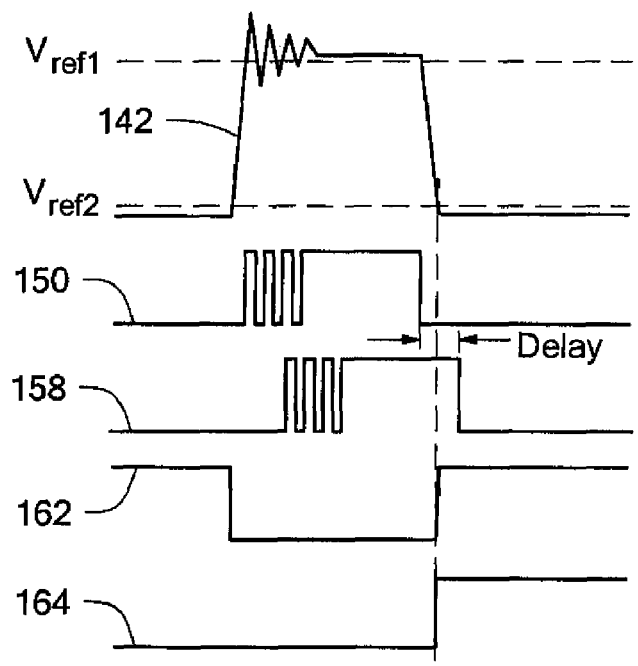
FIG. 3B shows several waveforms associated with the charging circuit of FIG. 3 when the output voltage has reached the desired level.

Referring also to FIG. 3B, the same waveforms as in FIG. 3A are shown. Here however, the output voltage Vout has reached the desired level. Thus, the output signal 150 of comparator 148 transitions several times as a result of the voltage spikes on the switch voltage crossing the reference voltage Vref1 and then stays high once the voltage spikes have dissipated. Here, however, when the switch voltage falls and crosses the reference voltage Vref2, causing the output signal 162 of comparator 160 to go high, the output signal 164 of AND gate 156 also goes high, as shown, thereby accurately indicating that the output voltage Vout has reached the desired level.

The delay provided by delay element 152 is selected to correspond to at least the time it takes the level-shifted switch voltage at node 142 to fall from its plateau to reference voltage Vref2. However, the delay should be short enough to prevent the voltage spikes at the node 142 from erroneously resulting in an indication that the capacitor is fully charged. In one illustrative embodiment, the delay element 152 provides a delay on the order of between 60 and 150 nanoseconds, such as 100 nanoseconds. Conventional circuit simulation techniques can be used to refine the optimal delay.

Figure 4:
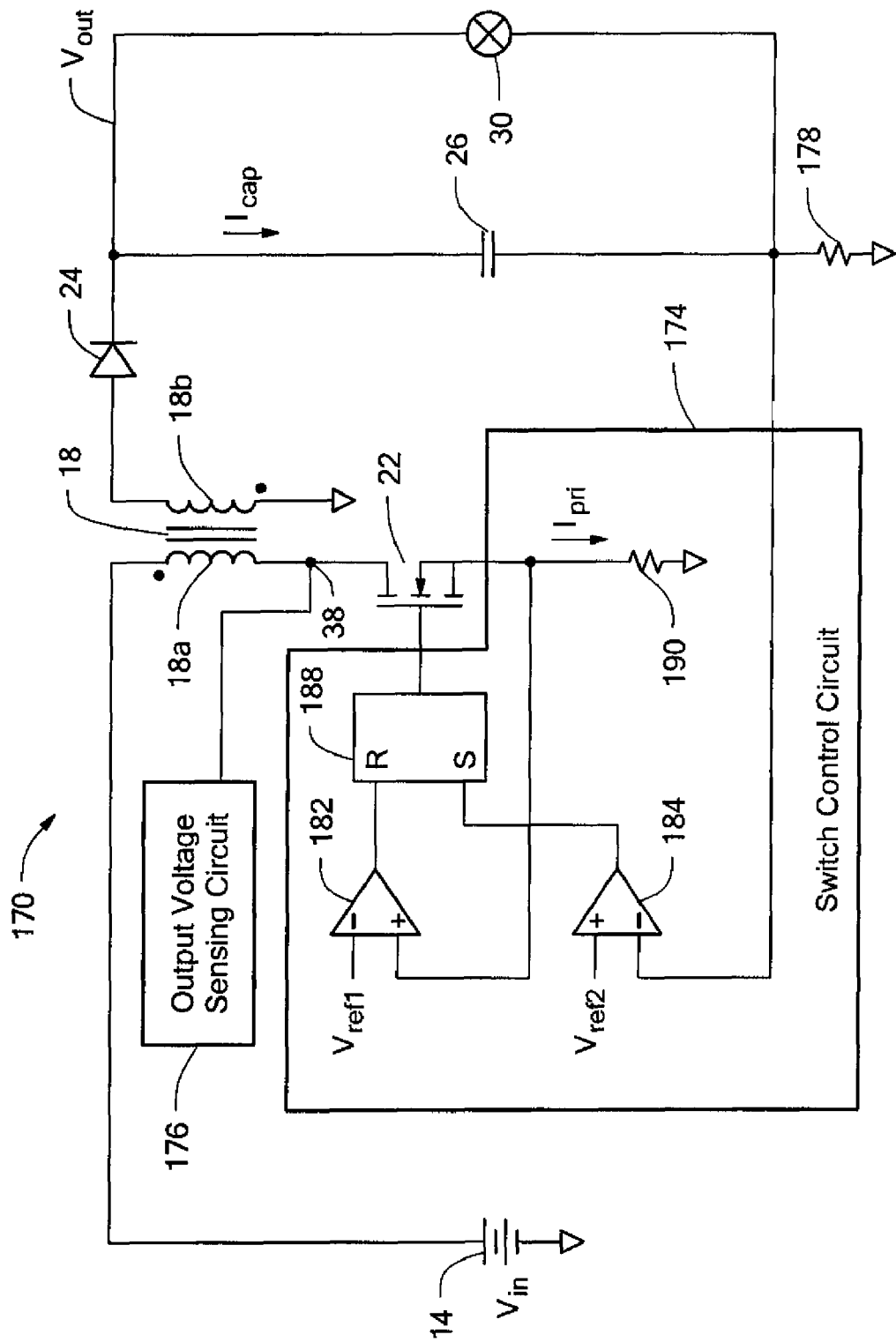
FIG. 4 is a schematic of a capacitor charging circuit including a circuit for sensing the output capacitor current according to a further aspect of the invention and a switch control circuit responsive to the sensed output capacitor current.

Referring to FIG. 4, a further alternative capacitor charging circuit 170 is shown in which like reference numbers refer to like elements. Circuit 170 includes input voltage source 14, transformer 18, switch 22, diode 24, and capacitor 26 coupled to a load 30, as shown. The circuit 170 includes an output voltage sensing circuit 176 coupled to the switch node 38, as may take the form of any of the circuits 40, 110, and 144 of FIGS. 1, 2, and 3, respectively, as examples.

Charger 170 also includes a resistor 178 coupled in series with the capacitor 26 in order to sense the capacitor current Icap and a switch control circuit 174. Switch control circuit 174 provides an alternative switch control scheme to the circuit 28 described above in conjunction with FIG. 1. Here, an on time portion of each switch cycle is controlled in response to sensed primary winding current and an off time portion is controlled in response to sensed output capacitor current Icap. The output capacitor current is sensed with resistor 178 coupled between the output capacitor 26 and ground, as shown.

It will be appreciated by those of ordinary skill in the art that the output capacitor current Icap may be sensed for reasons other than, or in addition to, use by the switch control circuit 174. One such reason is for use by an output voltage sensing circuit, as described and shown in conjunction with FIG. 2 for example. Another reason for sensing the capacitor current is for use by the circuit of FIG. 6 for speeding up the capacitor charging, as will be described.

The switch control circuit 174 includes a first comparator 182 having an inverting input adapted to receive a reference voltage Vref1 and a non-inverting input coupled to a resistor 190. The voltage across resistor 190 is proportional to the primary winding current Ipri. Thus, the output signal of comparator 182 is at a high logic level when the primary winding current Ipri is greater than a first predetermined current level as set by reference voltage Vref1 and a low logic level when the primary winding current Ipri is less than the first predetermined level.

The switch control circuit 174 further includes a second comparator 184 having a non-inverting input adapted to receive a reference voltage Vref2 and an inverting input coupled to resistor 178, as shown. Thus, the output signal of comparator 184 is at a low logic level when the output capacitor current Icap is greater than a second predetermined current level as set by reference voltage Vref2 and a high logic level when the output capacitor current Icap is less than the second predetermined level.

The output signal of comparator 182 is coupled to the reset input of a flip-flop or latch 188 and the output signal of comparator 184 is coupled to the set input of latch 188, as shown. The output signal of latch 188 provides the control signal to the gate of switch 22.

In operation, when the primary winding current Ipri reaches the first predetermined level, as established by reference voltage Vref1, the latch 188 is reset and the switch 22 is turned off. Once the output capacitor current Icap falls to below the second predetermined level, as established by reference voltage Vref2, latch 188 is set and the switch 22 turns on. By proper selection of the reference voltage Vref2, the circuit 170 can be made to operate in the boundary condition between continuous and discontinuous operation.

The above-described switch control circuit 174 provides an efficient scheme for charging the capacitive load 30, particularly in the illustrative photoflash charger application in which a wide voltage range is required by the load. Furthermore, this scheme achieves efficient performance with simplified circuitry than heretofore used. This is because of the use of the resistor 178 coupled to the output capacitor 26 to sense the capacitor current. In the above-referenced U.S. Pat. No. 6,518,733, a negative voltage is compared to a reference voltage because of the direction of the secondary current through the sense resistor.

Figure 5:
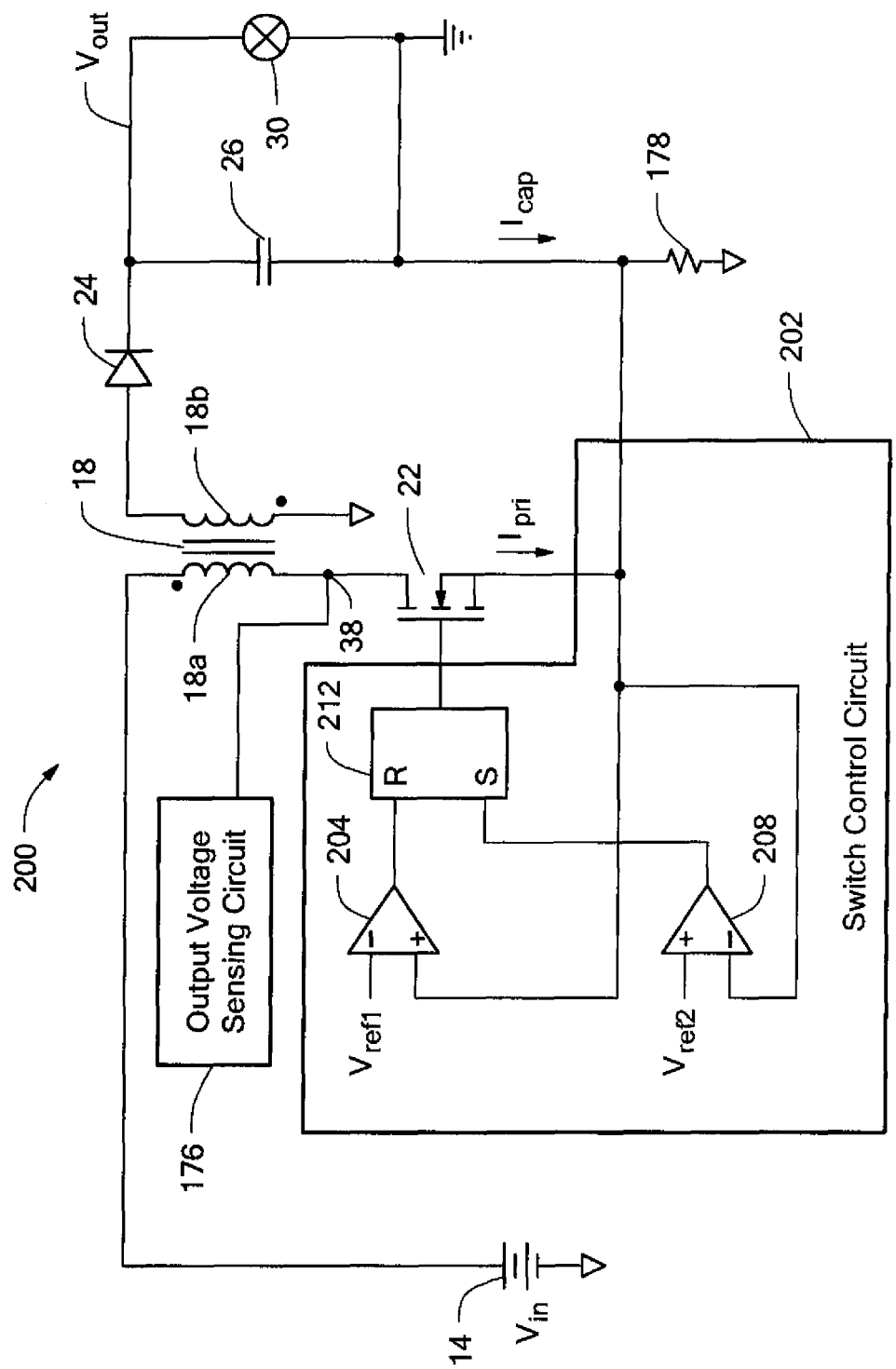
FIG. 5 is a schematic of an alternative embodiment of the capacitor charging circuit of FIG. 4 including the circuit sensing the output capacitor current and an alternative switch control circuit responsive to the sensed output capacitor current.

Referring also to FIG. 5, an alternative charging circuit embodiment 200 is shown, in which like reference numbers refer to like components. Thus, circuit 200 includes an input voltage source 14, a transformer 18, a switch 22, a diode 24, and an output capacitor 26, coupled as shown. Output voltage sensing circuit 176 is also shown.

The charging circuit 200 also includes resistor 178 coupled between the output capacitor 26 and ground and across which is provided a voltage indicative of the current through the output capacitor Icap. Here, as in the embodiment of FIG. 4, the output capacitor current is sensed for use by the switch control circuit.

The charging circuit 200 differs from the circuit 170 of FIG. 4 in the switch control circuit 202. Switch control circuit 202 achieves the same type of adaptive rate control as switch control circuit 174, but without requiring resistor 190 (FIG. 4). Thus, here again, an on time portion of each switch cycle is controlled in response to sensed primary winding current Ipri and an off time portion is controlled in response to sensed output capacitor current Icap. when switch 22 is on, the voltage across resistor 178 is indicative of the primary winding current Ipri. This is because when switch 22 is on, secondary current does not flow and so, the only current flowing through the resistor 178 is the primary current Ipri. Whereas, when switch 22 is off, the voltage across resistor 178 is indicative of the output capacitor current Icap.

Switch control circuit 202 includes a first comparator 204 having an inverting input adapted to receive a reference voltage Vref1 and a non-inverting input coupled to resistor 178, as shown. Thus, the output signal of comparator 204 is at a high logic level when the primary winding current Ipri is greater than a first predetermined level as set by reference voltage Vref1 and a low logic level when the primary winding current is less than the first predetermined level.

The switch control circuit 202 further includes a second comparator 208 having a non-inverting input adapted to receive a reference voltage Vref2 and an inverting input coupled to resistor 178, as shown. Thus, the output signal of comparator 208 is at a low logic level when the output capacitor current Icap is greater than a second predetermined level as set by reference voltage Vref2 and a high logic level when the output capacitor current is less than the second predetermined level.

The output signal of comparator 204 is coupled to the reset input of a flip-flop, or latch 212 and the output signal of comparator 208 is coupled to the set input. The output signal of latch 212 is coupled to the gate of switch 22, as shown.

In operation, when the primary winding current reaches the first predetermined level, as established by reference voltage Vref1, the latch 212 is reset and the switch 22 turns off. Once the output capacitor current Icap falls below the second predetermined level, as established by reference voltage Vref2, latch 212 is set and the switch 22 turns on.

Figure 6:
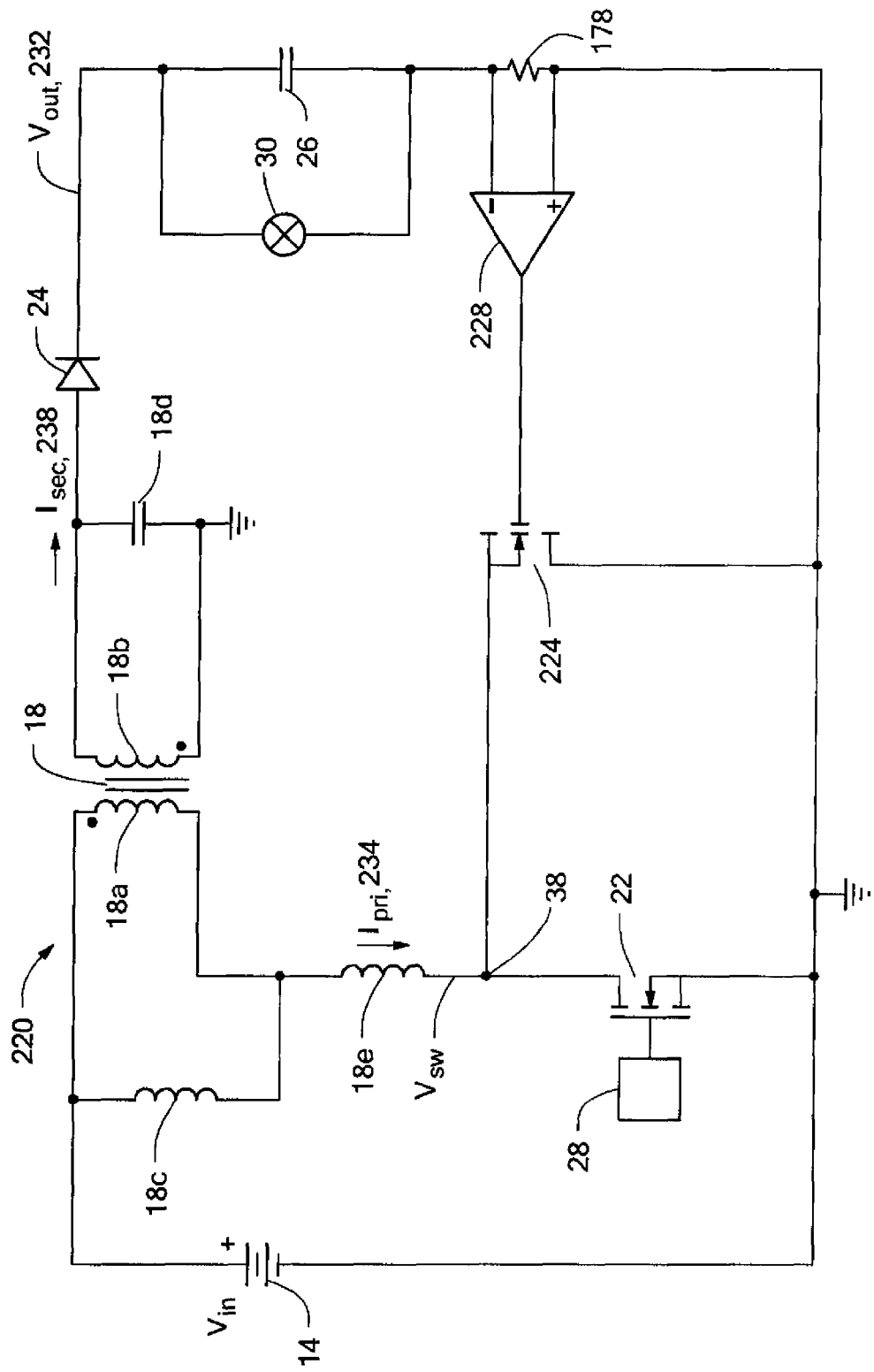
FIG. 6 is a schematic of a capacitor charging circuit including a circuit for reducing the capacitor charge time.

Referring to FIG. 6, a further alternative capacitor charging circuit 220 is shown, in which like reference numbers refer to like elements. Thus, charger 220 includes input voltage source 14, transformer 18, switch 22, switch control circuit 28 (here simplified for ease of illustration), diode 24, and capacitor 26 coupled to load 30, as shown. It will be appreciated that switch control circuit 28 may alternatively be provided by one of the circuits 174 and 202, as described in conjunction with FIGS. 4 and 5, respectively.

Circuit 220 further includes an auxiliary switch 224, here provided as a MOSFET device, and associated circuitry provided to reduce the reverse recovery time of the diode 24 and speed up the discharge of the secondary winding parasitic capacitance. Models of the flyback transformer 18, including parasitic elements of the transformer 18 are also shown in FIG. 6 in order to illustrate the advantages of the auxiliary switch 224. Specifically, the transformer magnetizing inductance 18c, effective parasitic capacitance 18d, and leakage inductance 18e are shown.

The reason that it is desirable to reduce the diode reverse recovery time is because during the reverse recovery time, the current through the parasitic capacitance and diode reflected to the primary side (i.e., since switch 22 is off, this current mainly flows through magnetizing inductance 18c) causes a negative current to flow through the magnetizing inductance 18c (a current that flows clockwise in 18c and 18a loop in FIG. 6) and thus a negative initial switch current when switch 22 turns on. The magnitude of the negative primary current swing increases with the output voltage. The negative switch current limits the minimum switch cycle and thus slows down charging of the capacitor 26. By reducing the diode reverse recovery time, the negative initial current is reduced and the switching cycles become shorter and thus, the capacitor 26 is charged faster than otherwise possible. For example, use of the auxiliary switch 224 can reduce the capacitor charging time by on the order of 6%-8%.

Auxiliary switch 224 is coupled in parallel with the main switch 22, so that the drain of the switch 224 is coupled to the drain of switch 22 and the source of switch 224 is coupled to the source of switch 22 and to ground. When switch 22 is on, the switch node 38 is coupled to ground through switch 224. When switch 224 is off, the switch 224 is decoupled from the switch node 38. The gate of switch 224 is coupled to the output of a comparator 228. The switch 224 is selected to have a higher Rdson and lower capacitance than the main switch 22 in order to have a faster response than the switch 22.

Comparator 228 has an inverting input coupled to the output capacitor current sense resistor 178 and a non-inverting input coupled to ground, as shown. When the output capacitor current Icap falls below zero amps, the output of comparator 228 goes high, thereby turning on auxiliary switch 224. This is the beginning of the diode recovery interval.

When switch 224 is on, the current Ipri, reflected from the current that flows through the secondary winding 18b of the transformer due to the diode recovery time, flows through switch 224 to ground. This leads to a faster collapse of the switch voltage Vsw at node 38 and allows the initiation of the next switch cycle to occur with shorter delay, thereby reducing the overall charging time for capacitor 26.

Figure 6A:
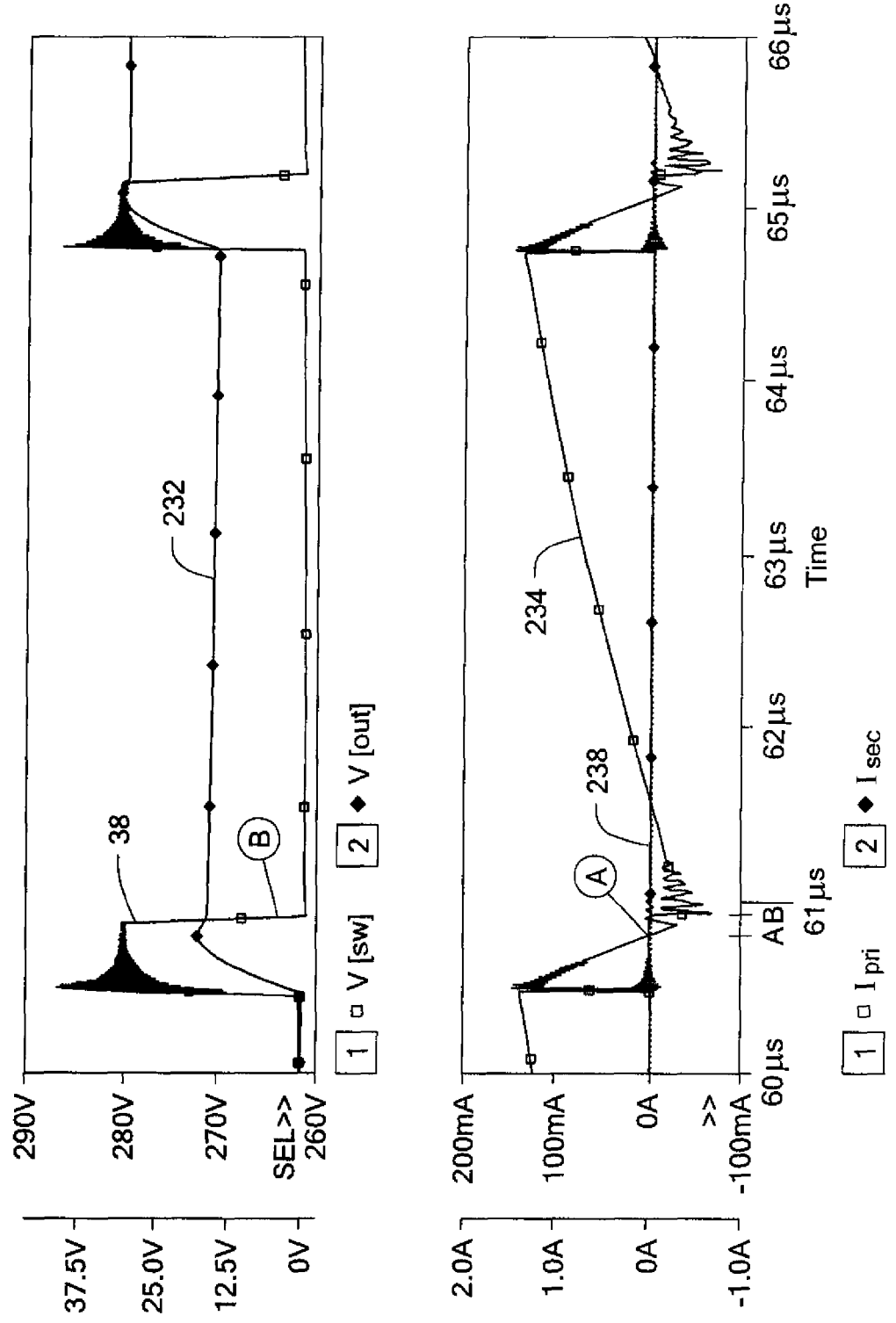
FIG. 6A shows several waveforms associated with a charging circuit substantially similar to the charging circuit of FIG. 6, but without the auxiliary switch.

Referring to FIG. 6A, various waveforms are provided to illustrate the advantages of the auxiliary switch 224 by showing operation of a circuit like circuit 220 of FIG. 6, but with the auxiliary switch 224 removed. That is, the waveforms 38, 232, 234, and 238 in FIG. 6A illustrate operation of the circuit 220 without the use of auxiliary switch 224. Specifically, waveform 38 shows the switch voltage Vsw at node 38, waveform 232 shows the output voltage Vout, waveform 234 shows the primary current Ipri that flows through the transformer leakage inductance 18e, and waveform 238 shows the secondary current Isec.

As is apparent, when the secondary current Isec, 238 reaches zero amps, at a time A, and the switch 22 is turned on, it takes on the order of 114 nanoseconds for the diode 24 to recover and thus for the switch voltage at node 38 to fall to the input voltage level, at a time B, so that positive primary current can begin to flow. This 114 nanosecond reverse recovery interval during each cycle, plus the time for the primary current Ipri to ramp from the peak negative current to zero, limits the minimum switch cycle or, alternatively the maximum switching frequency and thus slows down the charging of the output capacitor 26. With the switch 224 omitted from the circuit 220, it takes on the order of 76 µs to fully charge the capacitor 26.

Figure 6B:
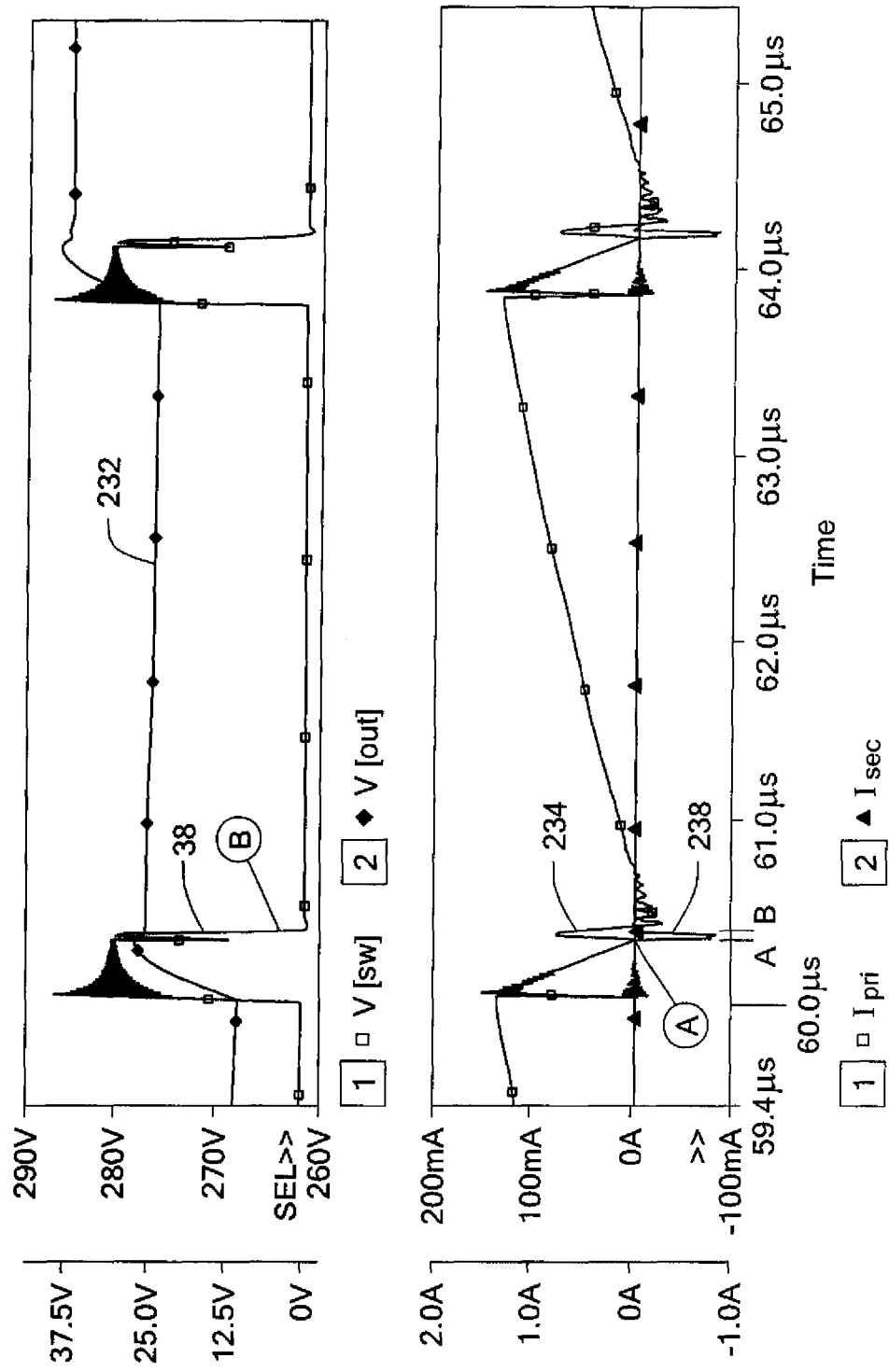
FIG. 6B shows several waveforms associated with the charging circuit of FIG. 6 with the auxiliary switch.

Referring also to FIG. 6B, waveforms 38, 232, 234, and 238 illustrate operation of the circuit 220 with the auxiliary switch 224 functioning as described above. Specifically, waveform 38 shows the switch voltage at node 38, waveform 232 shows the output voltage, waveform 234 shows the primary current Ipri that flows through the transformer leakage inductance 18e, and waveform 238 shows the secondary current Isec. With the use of auxiliary switch 224 operating as described above, when the secondary current 238 reaches zero amps, at a time A, the auxiliary switch 224 are turned on with sufficient speed. A higher magnitude of recovery current flows through the secondary winding, which in turn reduces the recovery time, leading to faster collapse of switch node voltage and lower negative primary current swing. In particular, it takes only on the order of 58 nanoseconds for the diode 24 to recover and thus for the voltage at node 38 to fall to the input voltage level, at a time B, so that primary current can begin to flow from a smaller negative current. Thus, the auxiliary switch 224 reduces each switch cycle, thereby reducing the time it takes to charge capacitor 26 as compared to a circuit without the auxiliary switch. With this arrangement, the capacitor 26 charges faster, such as on the order of 6%-8% faster in one illustrative embodiment. With the use of auxiliary switch 224 in circuit 220, it takes only on the order of 70 µs to fully charge the capacitor 26.

Figure 7:
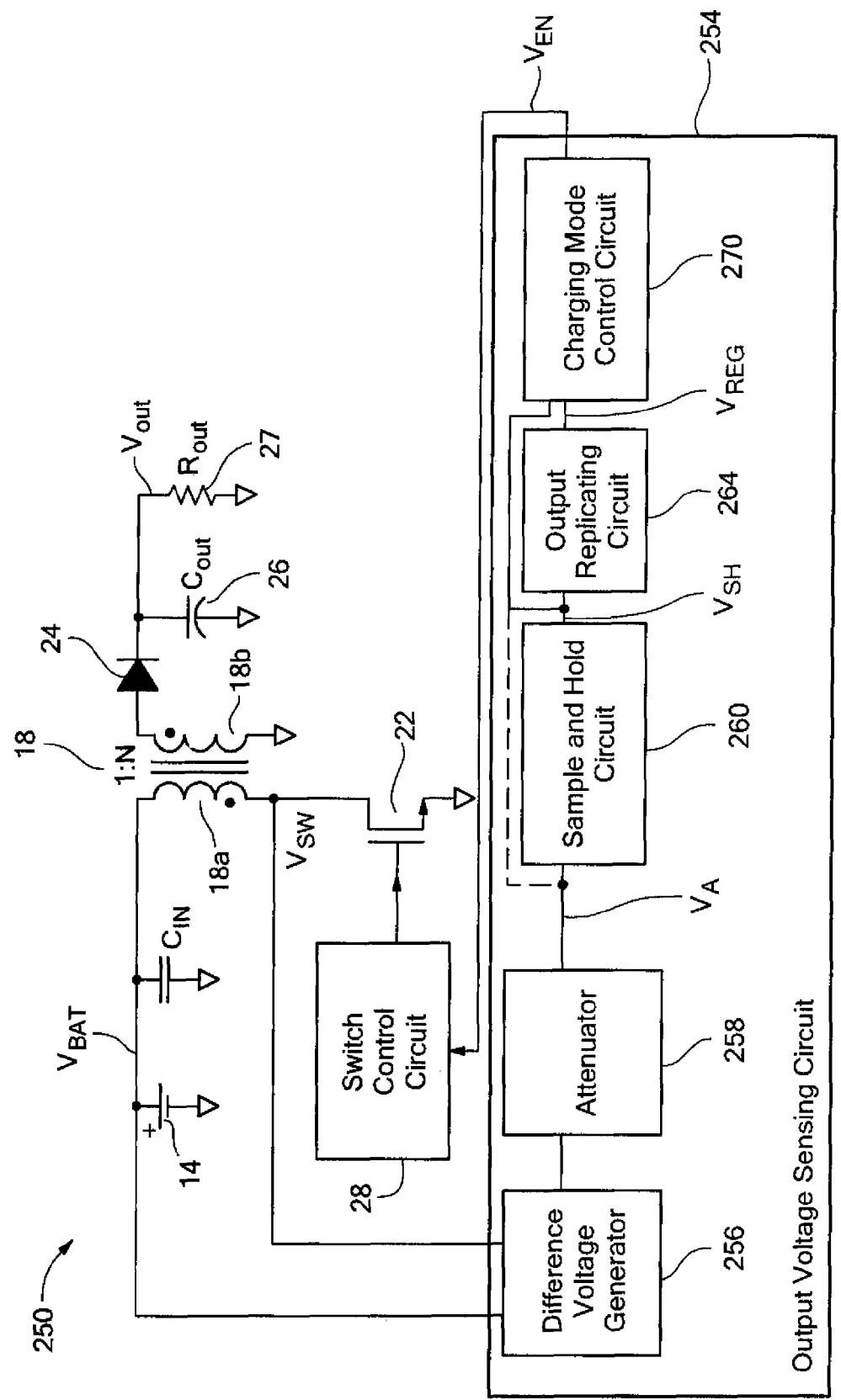
FIG. 7 is a schematic of a capacitor charging circuit having a primary side output voltage sensing circuit used to implement an output capacitor refresh feature according to an aspect of the invention.

Referring to FIG. 7, an alternative capacitor charging circuit 250 is shown, in which like reference numbers refer to like elements. The capacitor charging circuit 250 is of the same general flyback topology as the circuits described above and thus, includes input voltage source 14 providing an input, or battery voltage, here labelled $V_{BAT}$, transformer 18 having a primary winding 18a and a secondary winding 18b, switch 22, switch control circuit 28, diode 24, and output capacitor 26 across which a load, such as a camera photoflash, may be coupled. The switch control circuit 28 may take various forms. For example, the switch control circuit may be of the type described in connection with FIG. 2 in which the switch on time is controlled in response to the primary current level and the switch off time is controlled in response to the level of the switch voltage $V_{SW}$ or of the type described in connection with FIG. 4 in which the on time is controlled in response to the primary winding current and the off time is controlled in response to sensed output capacitor current. Alternatively, the switch control circuit 28 may take the form of circuit 406 in FIG. 11 in which the switch on time is controlled in response to the primary current level and the switch off time is controlled by detecting a change in the polarity of the slope of the switch voltage.

The circuit 250 differs from the above-described capacitor charging circuits in that it includes an output voltage sensing circuit 254 for implementing a "refresh" feature according to an aspect of the invention. Once the output voltage Vout reaches a desired level, capacitor charging is terminated and the switch 22 is turned off, thereby conserving power. The interval during which the capacitor is charged (i.e., when the switch is turned on and off) is referred to herein as the "charging mode." In order to keep the capacitor 26 at substantially full charge, it is desirable to detect the output voltage level and again charge (i.e., refresh or replenish) the capacitor as necessary to maintain the capacitor in a fully charged condition.

Like the above-described output voltage sensing circuits, circuit 254 senses the output voltage Vout from the primary side of the transformer 18 as is desirable in order to avoid the high power dissipation generally associated with secondary side voltage sensing in high output voltage circuits and does so in a manner that prevents incorrect sensing in response to voltage spikes occurring on the switch voltage $V_{SW}$ when the switch 22 turns off Advantageously, the output voltage sensing circuit 254 detects the output voltage Vout continuously, even after the charging mode is terminated. Thus, the circuit 254 detects the output voltage Vout based on a primary side reflection of the output voltage both as the output voltage increases during the charging mode, and also as the output voltage gradually decreases once the charging mode is terminated. With this arrangement, the charging mode is not commenced unnecessarily since it is not commenced until detection of the output voltage Vout dictates that the capacitor charge should be replenished.

The output voltage sensing circuit 254 is shown in block diagram form in FIG. 7 to include a difference voltage generator 256 and an attenuator 258. These elements are similar to like elements described above, for example in connection with FIG. 1 as a summing element 50 and a level shifter comprising resistors 54 and 58. Thus, the difference voltage generator 256 provides the voltage across the primary winding 18a and the attenuator 258 shifts down the level of the difference voltage. The attenuator output voltage $V_A$ is thus proportional to the output voltage Vout when the switch 22 is off. A filter (shown in FIGS. 8, 10 and 10A) may be provided at the output of the attenuator 258 in order to average, or smooth the attenuated voltage $V_A$.

Figure 10:
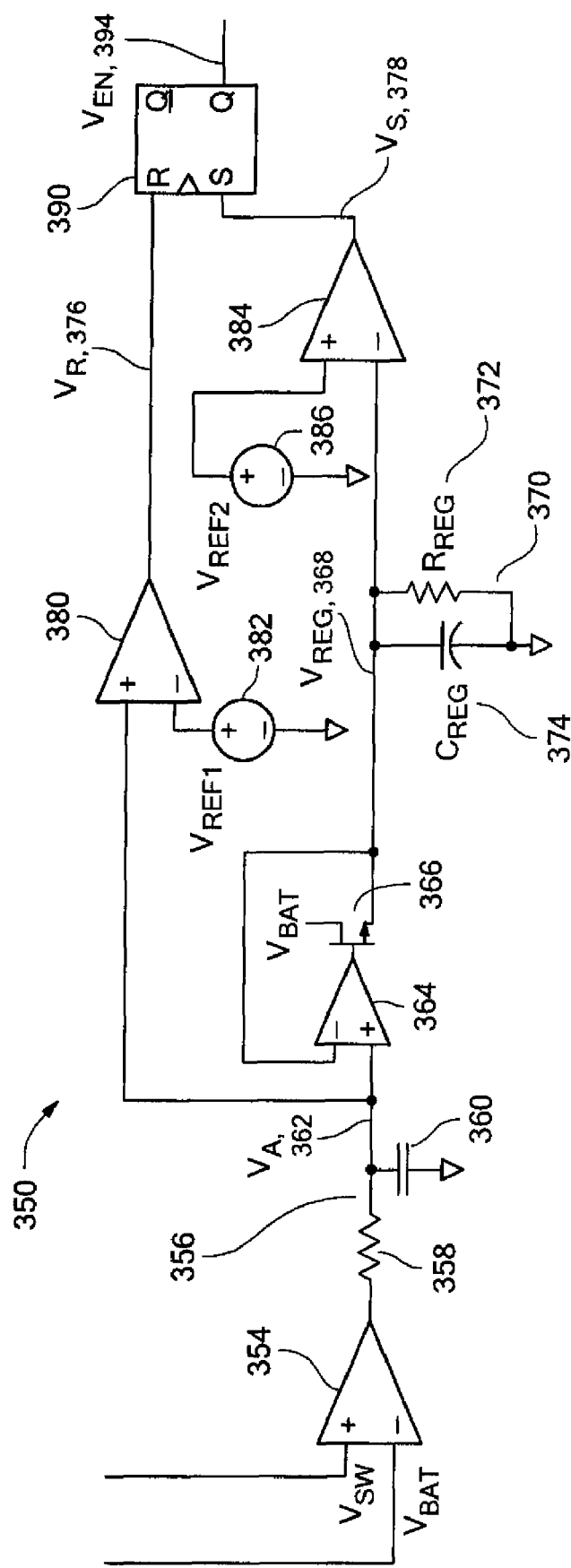
FIG. 10 is a schematic of an alternative embodiment of the output voltage sensing circuit of FIG. 7.

A sample and hold circuit 260 is responsive to the attenuated voltage $V_A$ and provides a sampled and held voltage $V_{SH}$. The sample and hold circuit 260 may take various forms. For example, in the embodiment of FIG. 8, the sample and hold circuit operates to sample the attenuated voltage during the switch off time and holds the sampled voltage thereafter. In the embodiment of FIG. 10, the sample and hold circuit charges a capacitor to peaks of the attenuated voltage $V_A$ and thus may be described alternatively as a peak charger. And in FIG. 10A, a sample and hold circuit is not used.

The output voltage sensing circuit 254 further includes an output replicating circuit 264 that replicates the discharge characteristics of the output capacitor 26 (or, more generally, that exhibits discharge characteristics having a predetermined relationship with respect to the output capacitor discharge characteristics) and provides a regulation voltage $V_{REG}$ to a charging mode control circuit 270. The regulation voltage $V_{REG}$ tracks the output voltage Vout both as the output voltage increases (i.e., tracks the positive slope of the output voltage) and significantly, also tracks the output voltage as it decreases (i.e., tracks the negative slope of the output voltage). As will be described, the charging mode is commenced (i.e., the capacitor 26 is replenished) based on the regulation voltage $V_{REG}$ and thus, is commenced based on a measured indication of output voltage droop. With this arrangement, power is conserved by not unnecessarily commencing the charging mode before it is necessary.

Figure 8:
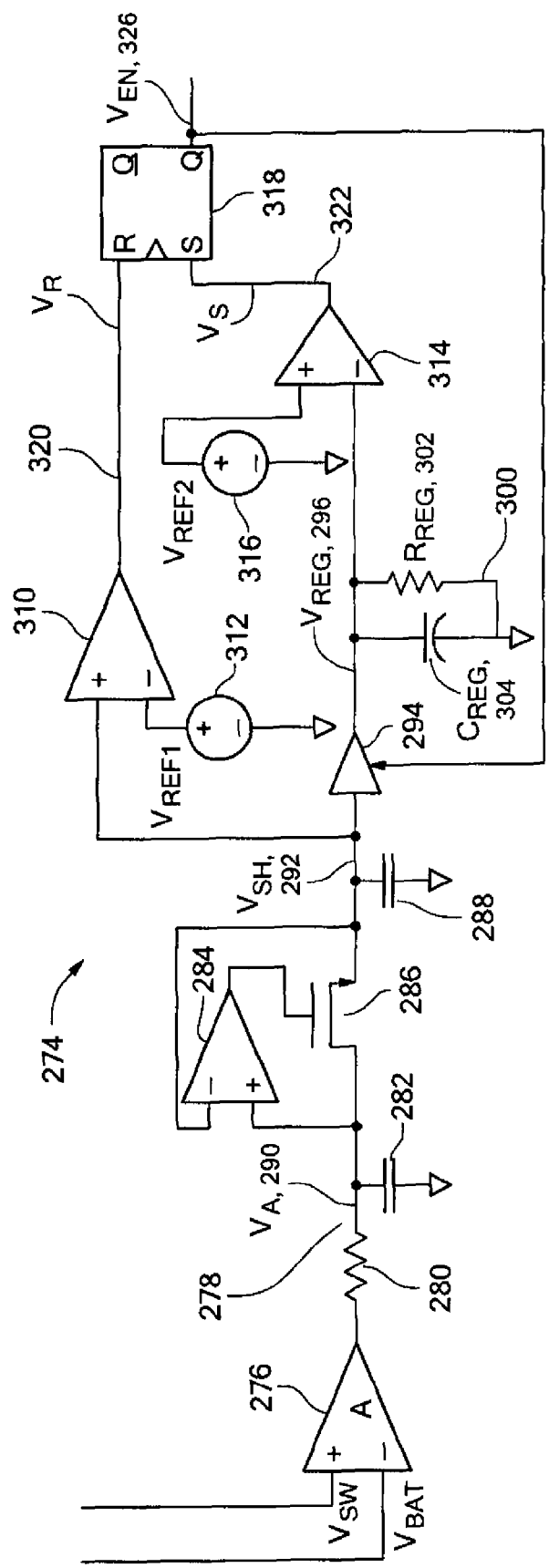
FIG. 8 is a schematic of one embodiment of the output voltage sensing circuit of FIG. 7.
Figure 10A:
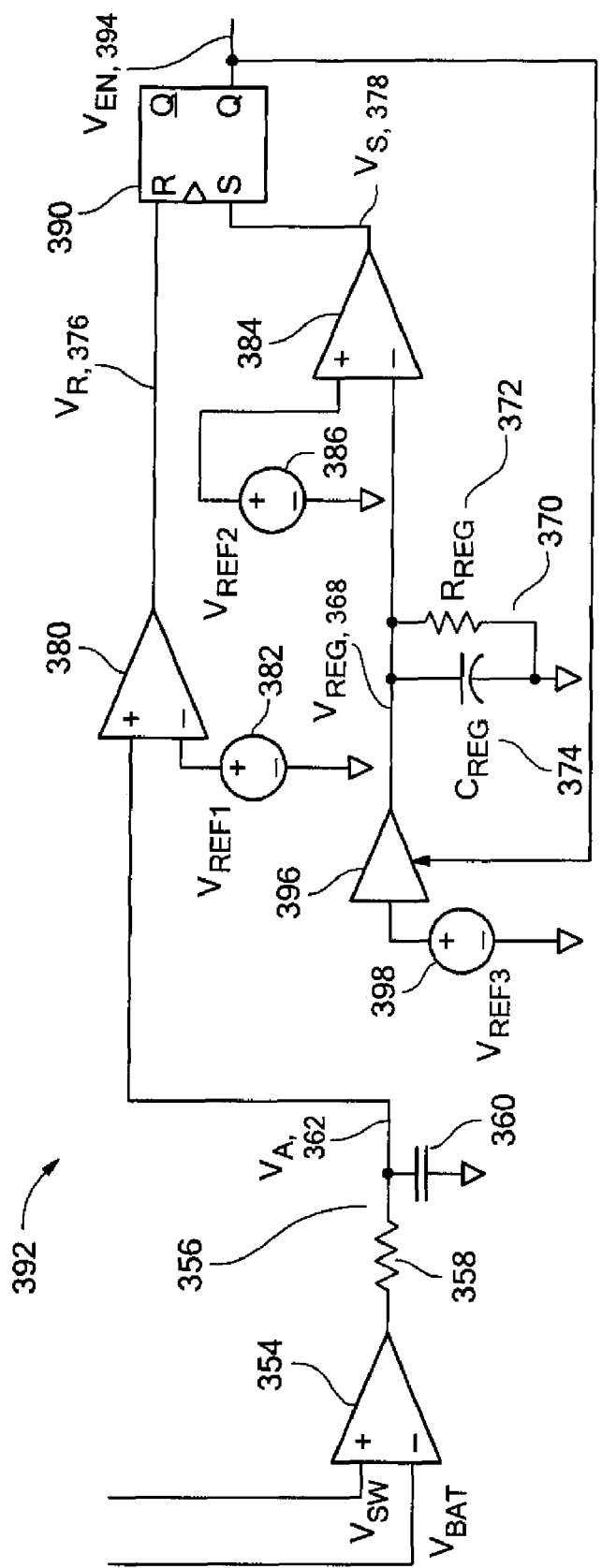
FIG. 10A is a schematic of a further alternative embodiment of the output voltage sensing circuit of FIG. 7.

More particularly, the output capacitor 26 has a capacitance and a leakage resistance associated therewith. The leakage resistance is shown as a separate resistor element 27 for illustration purposes. Preferably, the output replicating circuit 264 comprises a resistor and a capacitor forming an RC network as shown in the embodiments of FIGS. 8, 10 and 10A. The RC time constant of the RC network has a predetermined relationship to an RC time constant associated with the capacitance and the leakage resistance of the output capacitor 26. For example, the RC time constant of the circuit 264 may be substantially equal to the RC time constant of the output capacitor 26. Thus, in this case, the regulation voltage $V_{REG}$ will rise and fall, or decay at the same rate as the output voltage Vout. Alternatively, the RC time constant of the circuit 264 may be selected to be less than the RC time constant of the output capacitor 26, in which case the regulation voltage $V_{REG}$ will rise and fall faster than the output voltage. This arrangement may be advantageous in applications in which it is desirable to more closely regulate the output voltage. The RC time constant of the circuit 264 may also be greater than the RC time constant of the output capacitor.

In order to ensure that the regulation voltage $V_{REG}$ decays at a predetermined rate with respect to the output voltage, it is advantageous to closely locate the circuit 264 and the output capacitor 26, so that they experience similar temperature variations. In the case of the illustrative photoflash charger application, the components will be sufficiently closely spaced since they will be housed inside a camera. It is also advantageous to use the same type of capacitor for the output capacitor 26 and the capacitor of the RC network 264, such as both being electrolytic capacitors. While the output replicating circuit 264 is described herein as being an RC network, it will be appreciated by those of ordinary skill in the art that alternative circuitry could be used to replicate the output capacitor, particularly in terms of the rate of voltage decay, or discharge characteristics, such as an LR network.

The charging mode control circuit 270 is responsive to the regulation voltage $V_{REG}$ and to the attenuated voltage $V_A$ (or the sampled and held voltage $V_{SH}$ as shown by the dotted line) and provides an enable signal $V_{EN}$ to the switch control circuit 28, as shown. When the enable signal $V_{EN}$ is at a first logic level, such as at a high logic level, the switch control circuit 28 is enabled to turn the switch 22 on and off (i.e., the charging mode is enabled). Whereas, when the enable signal $V_{EN}$ is at a second logic level, such as a low logic level, the switch control circuit is disabled, thereby preventing the switch from turning on and off and terminating the charging mode (i.e., the charging mode is disabled).

Referring also to FIG. 8, an embodiment 274 of the output voltage sensing circuit 254 of FIG. 7 is shown. The output voltage sensing circuit 274 includes a difference voltage generator in the form of an operational amplifier 276 having a gain A. The output of the amplifier 276 is thus an attenuated version of the primary winding voltage which is proportional to the output voltage Vout during the switch off times. In one illustrative embodiment, in which the nominal output voltage is on the order of 300 volts, the nominal input voltage is on the order of 1.5 volts to 10 volts, the transformer turns ratio is on the order often, and the amplifier gain A is on the order of 1/26, the nominal amplifier output voltage is on the order of 1.2 volts.

A filter 278 is coupled to the output of the operational amplifier 276 and here, is provided in the form an RC filter including a resistor 280 and a capacitor 282. Filter 278 averages, or smoothes the reflected voltage so as to remove at least the majority of the voltage spikes that occur when the switch turns off, as described above in connection with the filter of FIG. 1. The output voltage of the filter, here the attenuated voltage $V_A$, is provided at a circuit node 290.

The filter 278 is coupled to a sample and hold circuit, here comprising a comparator 284, a switch 286, and a capacitor 288. The comparator 284 has a non-inverting input coupled to the filter 278, an inverting input coupled to the capacitor 288, and an output coupled to a control terminal of the switch 286. The switch 286 is coupled in series between the filter 278 and the capacitor 288 or (i.e., between circuit node 290 and a circuit node 292 at which the sampled and held voltage $V_{SH}$ is provided).

In operation, when the voltage at node 290 increases above the voltage at node 292 by more than the forward voltage drop of the switch 286, the output of the comparator 284 goes high to turn on the switch 286, thereby causing the capacitor 288 to be charged to the level of the attenuated voltage $V_A$ at node 290 (i.e., causing the reflected output voltage to be sampled). At other times, the comparator output is low and the switch 286 does not conduct, thereby causing the previously sampled voltage to be held. In this way, the voltage $V_{SH}$ at circuit node 292 tracks the positive slope of the output voltage Vout.

The sampled and held voltage $V_{SH}$ is coupled to a buffer 294 that, in turn, is coupled to the output replicating network, here in the form of an RC network 300 comprising a resistor 302 and a capacitor 304. With this arrangement, the RC network 300 is charged with the sampled and held voltage $V_{SH}$ so as to cause the regulation voltage $V_{REG}$ across the RC network 300 to track the positive slope of the output voltage. Thus, the sampled and held voltage $V_{SH}$ is substantially equal to the regulation voltage $V_{REG}$ as the output capacitor is charged, when the charging mode is enabled. The buffer 294 prevents the regulation voltage $V_{REG}$ across the RC network 300 from being discharged through the capacitor 288. This is achieved by providing the buffer 294 in the form of a tri-state buffer that provides an open-collector output in response to the enable signal $V_{EN}$ 326 going low. Thus, the buffer 294 disconnects the RC network 300 from the sample and hold circuit when the enable signal $V_{EN}$ 326 is low (i.e., when the charging mode is terminated). The buffer 294 additionally provides current charging capability for charging the capacitor 304 when the switch 286 is closed.

The charging mode control circuit includes the buffer 294, a "full charge" comparator 310, a "low charge" comparator 314, and a flip-flop 318. The output of the flip-flop 318 provides the enable signal $V_{EN}$ 326 to the switch control circuit 28 (FIG. 7). The comparator 310 has a first input, here the non-inverting input, coupled to the sampled and held voltage $V_{SH}$ and a second input, here the inverting input, that is coupled to a reference voltage Vref1 312. The output of the comparator 310 provides a reset signal $V_R$ 320 to the flip-flop 318. In operation, when the output voltage Vout reaches a desired, fully-charged level, the output of comparator 310 goes high to reset the flip-flop 318, which in turn causes the enable signal $V_{EN}$ 326 to go low to terminate the charging mode. Thus, the reset signal $V_R$ can be referred to as a full charge indicator signal. The reference voltage Vref1 is selected so that the output of the comparator 310 transitions to indicate a fully charged condition when the output voltage Vout has reached the desired fully charged level.

Comparator 314 has a first input, here the inverting input, responsive to the regulation voltage $V_{REG}$ 296 across the RC network 300 and a second input, here the non-inverting input, coupled to a second reference voltage Vref2 316. The output of the comparator 314 provides a set signal $V_S$ 322 to the flip-flop 318. In operation, when the output voltage Vout falls to a low, unacceptable level, the output of comparator 314 goes high to set the flip-flop 318, which in turn causes the enable signal $V_{EN}$ to go high to commence the charging mode. Thus, the set signal $V_S$ 322 can be referred to as a low, or unacceptable charge indicator signal. Here, the second reference voltage Vref2 is selected to be a percentage of the first reference voltage Vref1, such as 90%. More generally however, the reference voltage Vref2 316 is selected to cause the set signal $V_S$ 322 to go high when the output voltage has fallen to an unacceptable level requiring replenishment of the capacitor charge. Thus, the enable signal $V_{EN}$ 326 goes high to commence the charging mode of operation when the output voltage Vout falls to an unacceptable level and goes low to terminate the charging mode when the output voltage rises to the fully charged level, as is desirable.

Figure 9:
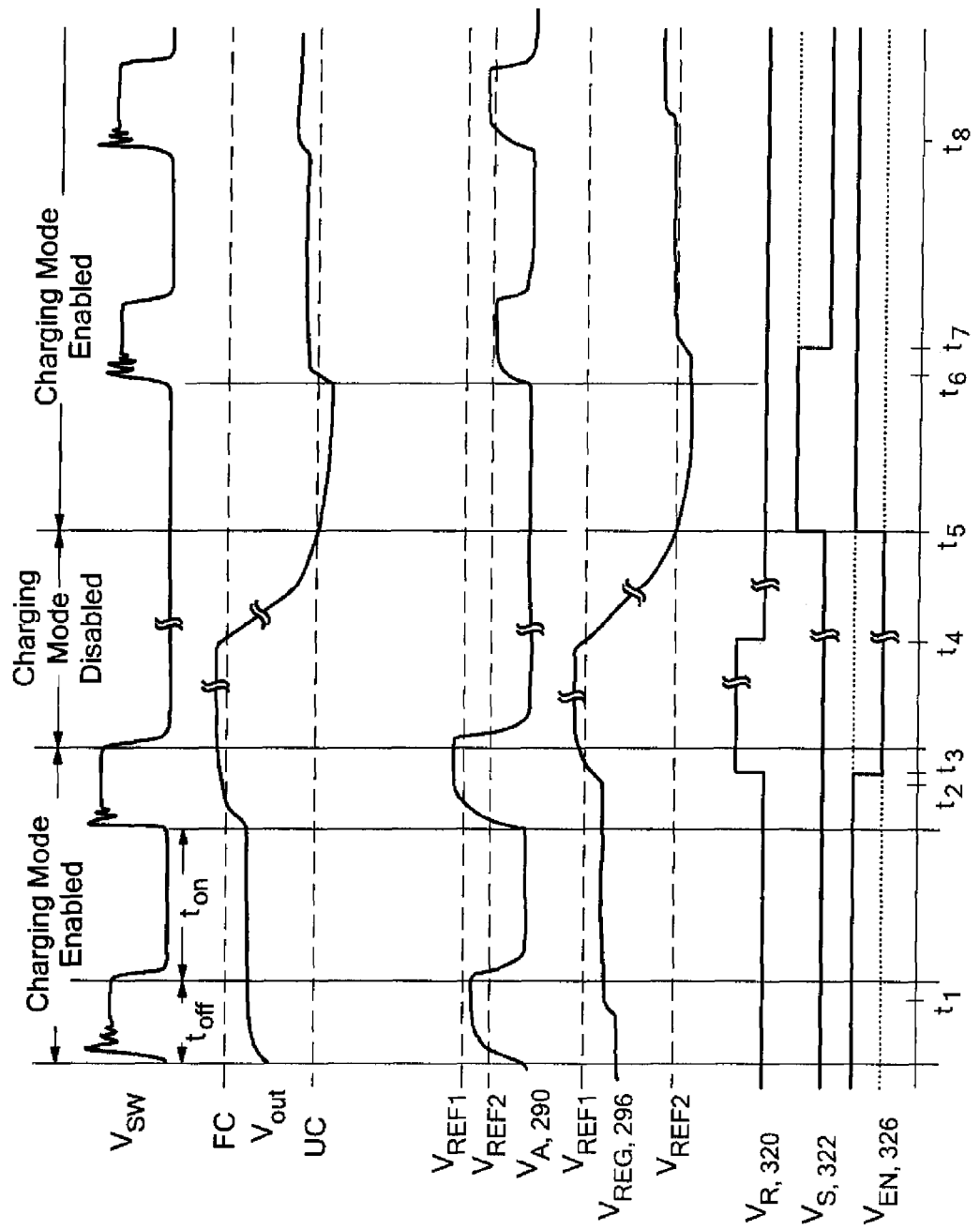
FIG. 9 shows several illustrative waveforms associated with the capacitor charging circuit of FIGS. 7 and 8.

Referring to FIG. 9, illustrative waveforms associated with the capacitor charging circuit of FIGS. 7 and 8 are shown. In particular, the switch voltage $V_{SW}$ waveform is shown to include intervals, labeled "charge mode enabled," during which the switch 22 is turned on and off, as labeled ton and toff respectively, for the first cycle. The switch voltage $V_{SW}$ waveform also includes a "charge mode disabled" interval during which the switch 22 remains off.

Also shown in FIG. 9 is an illustrative output voltage Vout waveform. The output voltage Vout rises each time the switch 22 is turned off, at which time charge is delivered from the primary winding 18a to the secondary winding and from the secondary winding to the output capacitor 26. A full charge level, labeled FC, and an unacceptable charge level, UC, are shown in FIG. 9 in relation to the output voltage Vout. The FC level represents the desired voltage level at which the capacitor 26 is considered fully charged and the UC level is the voltage level below which the output voltage is unacceptable and thus, is the voltage level below which the capacitor charge should be replenished. In a typical photoflash charger application, the UC level is on the order of ten to twenty percent below the FC level.

The attenuated voltage $V_A$, as provided at circuit node 290 of FIG. 8, is shown in relation to the Vref1 voltage and the Vref2 voltage. Recall that the Vref1 voltage is selected to correspond to the fully charged capacitor voltage level and the Vref2 voltage is selected to correspond to the low, or unacceptable capacitor voltage level.

The regulation voltage $V_{REG}$ 296 is also shown in relation to the Vref1 voltage and the Vref2 voltage. Recall that the regulation voltage $V_{REG}$ increases once the attenuated voltage $V_A$ exceeds the sampled and held voltage $V_{SH}$ by the small voltage drop of the switch 286. Thus, the sampled and held voltage $V_{SH}$ is substantially equal to the $V_{REG}$ voltage 296 during the charging modes. More particularly, here, the attenuated voltage $V_A$ exceeds the sampled and held voltage $V_{SH}$ by more than the forward drop of the switch 286, thereby causing the switch 286 to close and the $V_{REG}$ voltage to rise, at times labeled t1, t2, t6, and t8. Shortly after time t2, at time t3, the regulation voltage $V_{REG}$ exceeds the Vref1 voltage, thereby causing the reset signal $V_R$ 320 to go high to indicate that the output voltage Vout has reached the desired fully charged level. The reset signal $V_R$ 320 going high causes the enable signal $V_{EN}$ 326 to go low, thereby disabling the charging mode, as shown.

Once the charging mode is disabled, the output voltage Vout will slowly decay, or droop. In the illustrative embodiment, in the absence of a load, the output voltage Vout decays very slowly, primarily as a result of the leakage resistance 27, as compared to the time it takes to charge the output capacitor 26 from zero volts to a full charge of approximately 300 volts. For example, in one illustrative embodiment in which the output capacitor is a 10 µf capacitor and the battery voltage is on the order of 1.8 volts to 10 volts, it takes on the order of 1 s to charge the output capacitor from zero to 300 volts and it takes on the order of 22 s for the output voltage to decay to 90% of its fully charged level. The time scale of the capacitor discharge is condensed in FIG. 9 for ease of illustration. Generally, the time required for the regulation voltage $V_{REG}$ to discharge from Vout to $V_T$ is given by $T=R \cdot C \cdot \ln(Vout/V_T)$. At time t4, the output voltage has drooped from slightly above the fully charged level back down to the fully charged level and the regulation voltage $V_{REG}$ has fallen to the Vref1 level, causing the reset signal $V_R$ 320 to go low.

Significantly, the rate of decay of the output voltage Vout is substantially equal to the rate of decay of the regulation voltage $V_{REG}$, as shown. Recall that, most generally, a predetermined relationship exists between the rate of decay of the output voltage Vout and the rate of decay of the regulation voltage $V_{REG}$, with the rates being equal in the example of FIG. 9. As mentioned above, in some embodiments, it may be desirable to set the RC time constant of the network 300 to be shorter than the time constant associated with the output capacitor as a way of more tightly regulating the output voltage.

By time t5, the output voltage Vout has decayed to the unacceptable level UC, as shown. Shortly thereafter, the regulation voltage $V_{REG}$ falls to below the Vref2 voltage level, thereby causing the set signal $V_S$ 322 to go high to set the flip-flop 318 and thus, causing the enable signal $V_{EN}$ 326 to go high to commence the charging mode.

Once the charging mode is enabled, the output voltage Vout begins to increase again and by time t6, the output voltage exceeds the unacceptable charge level UC. Shortly thereafter, at time t7, the regulation voltage $V_{REG}$ exceeds the Vref2 voltage, causing the set signal $V_S$ 322 to go low. The output voltage continues to rise during each switch off time and the regulation voltage $V_{REG}$ tracks the rise of the output voltage, as shown.

Referring also to FIG. 10, an alternative embodiment 350 of the output voltage sensing circuit 250 of FIG. 7 is shown. Essentially, the output voltage sensing circuit 350 differs from the circuit 274 of FIG. 8 in the sample and hold circuitry, as will be described. Thus, the output voltage sensing circuit 350 includes an operational amplifier 354, like operational amplifier 276 of FIG. 8, that provides an attenuated version of the primary winding voltage which is proportional to the output voltage during the switch off times. Circuit 350 further includes a filter 356 that, like filter 278 of FIG. 8, smoothes the reflected voltage to remove the majority of the voltage spikes that occur when the switch turns off.

The output voltage sensing circuit 350 includes an output replicating RC network 370 including a resistor 372 and a capacitor 374. As above, the resistor 372 and the capacitor 374 are selected to provide the RC network 370 with an RC time constant having a predetermined relationship with respect to the RC time constant of the output capacitor 26.

The voltage at node 362, here the attenuated voltage $V_A$, is coupled to sample and hold circuitry including a comparator 364 and a switch 366. A second input of the comparator 364 is responsive to the regulation voltage $V_{REG}$ 368 and an output of the comparator is coupled to a control terminal of the switch 366. Switch 366 is coupled between a voltage source, such as the battery voltage $V_{BAT}$ as shown, and the RC network 370.

In operation, when the attenuated voltage $V_A$ 362 exceeds the regulation voltage $V_{REG}$ 368, the output of comparator 364 transitions to a logic high level to cause the switch 366 to conduct. With the switch 366 on, the battery voltage $V_{BAT}$ charges the capacitor 374. Thus, the comparator 364 and switch 366 operate as a peak charger to maintain the $V_{REG}$ voltage 368 at the peaks of the attenuated voltage $V_A$ 362 and thus, the sampled and held voltage $V_{SH}$ (FIG. 7) is equal to the regulation voltage $V_{REG}$ in the embodiment of FIG. 10. Once the output voltage Vout begins to droop, the output of the comparator 364 will remain at a logic low level and the switch 366 will thus, remain off, thereby allowing the regulation voltage $V_{REG}$ 368 to droop in a predetermined relationship with respect to the output voltage, as is desirable. It will be appreciated by those of ordinary skill in the art that the voltage applied to the switch 366 for charging the capacitor 374 may be any suitable voltage capable of providing sufficient charge to the capacitor when the switch 366 conducts, of which the battery voltage $V_{BAT}$ is one example.

Charging mode control circuitry includes a first, full charge comparator 380, a second, low charge comparator 384, and a flip-flop 390. The output of the flip-flop 390 provides the enable signal $V_{EN}$ 392 to the switch control circuit to enable and disable the charging mode. The comparator 380 has a first input, here the non-inverting input, coupled to the attenuated voltage $V_A$ at circuit node 362 and a second input, here the inverting input, that is coupled to a reference voltage Vref1 382. The output of the comparator 380 provides a reset signal $V_R$ 376 to the flip-flop 390. In operation, when the output voltage Vout reaches the desired, fully-charged level, the output of comparator 380 goes high to reset the flip-flop 390. Thus, the output signal $V_R$ can be referred to as a full charge indicator signal.

The comparator 384 has a first input, here the inverting input, responsive to the regulation voltage $V_{REG}$ 368 across the RC network 370 and a second input, here the non-inverting input, responsive to a second reference voltage Vref2 386. The output of the comparator 384 provides a set signal Vs 378 to the flip-flop 390. In operation, when the output voltage Vout falls to a low, unacceptable level, the output of comparator 384 goes high to set the flip-flop 390, which in turn causes the enable signal $V_{EN}$ 394 to go high to enable the charging mode. Thus, the set signal $V_S$ 378 can be referred to as a low, or unacceptable charge indicator signal. Here again, the second reference voltage Vref2 is selected to be a percentage of the first reference voltage Vref1, such as 90%. More generally however, the reference voltage Vref2 386 is selected to cause the set signal $V_S$ 378 to set the flip-flop 390 when the output voltage has fallen to an unacceptable level requiring replenishment of the capacitor charge. Thus, the enable signal $V_{EN}$ 394 goes high to commence the charging mode of operation when the output voltage Vout falls to an unacceptable level and goes low to terminate the charging mode when the output voltage rises to the fully charged level, as is desirable.

The waveforms associated with the output voltage sensing circuit 350 of FIG. 10 are substantially identical to like waveforms associated with the output voltage sensing circuit 274 of FIG. 8 as shown in FIG. 9.

Referring also to FIG. 10A, a further alternative embodiment 392 of the output voltage sensing circuit 250 of FIG. 7 is shown. The output voltage sensing circuit 392 differs from the circuit 350 of FIG. 10 in that the sample and hold circuitry has been eliminated, as will be described. Thus, the output voltage sensing circuit 392 includes operational amplifier 354 that provides an attenuated version of the primary winding voltage which is proportional to the output voltage during the switch off times. Circuit 392 further includes filter 356 that smoothes the reflected voltage to remove the majority of the voltage spikes that occur when the switch turns off.

The output voltage sensing circuit 392 includes output replicating RC network 370 including resistor 372 and capacitor 374. As above, the resistor 372 and the capacitor 374 are selected to provide the RC network 370 with an RC time constant having a predetermined relationship with respect to the RC time constant of the output capacitor 26.

Charging mode control circuitry includes a first, full charge comparator 380, a second, low charge comparator 384, and a flip-flop 390. The output of the flip-flop 390 provides the enable signal $V_{EN}$ 392 to the switch control circuit to enable and disable the charging mode. The comparator 380 has a first input, here the non-inverting input, coupled to the attenuated voltage $V_A$ at circuit node 362 and a second input, here the inverting input, that is coupled to a reference voltage Vref1 382. The output of the comparator 380 provides a reset signal $V_R$ 376 to the flip-flop 390. In operation, when the output voltage Vout reaches the desired, fully-charged level, the output of comparator 380 goes high to reset the flip-flop 390. Thus, the output signal $V_R$ can be referred to as a full charge indicator signal.

The comparator 384 has a first input, here the inverting input, responsive to the regulation voltage $V_{REG}$ 368 across the RC network 370 and a second input, here the non-inverting input, responsive to a second reference voltage Vref2 386. The output of the comparator 384 provides a set signal Vs 378 to the flip-flop 390.

A reference voltage source 398 providing a third reference voltage Vref3 398 is coupled to a buffer 396. The output of the buffer 396 is coupled to the RC network 370 that provides the regulation voltage $V_{REG}$ 368, as shown. The buffer 396 is a tri-state buffer that provides an open-collector output in response to the enable signal $V_{EN}$ 326 going low. Thus, when the enable signal $V_{EN}$ 394 is high (i.e., during the charging mode), the buffer 396 provides current charging capability for charging the capacitor 374. And when the enable signal $V_{EN}$ 394 is low (i.e., when the charging mode is terminated), the buffer 396 disconnects the RC network 370 from the reference voltage Vref3 398. The third reference voltage Vref3 398 that charges the capacitor 374 during the charging mode can be any suitable voltage capable of providing sufficient charge to the capacitor, of which the battery voltage $V_{BAT}$ is one example.

In operation, when the output voltage Vout falls to a low, unacceptable level, the output of comparator 384 goes high to set the flip-flop 390, which in turn causes the enable signal $V_{EN}$ 394 to go high to enable the charging mode. Thus, the set signal $V_S$ 378 can be referred to as a low, or unacceptable charge indicator signal. Here again, the second reference voltage Vref2 is selected to be a percentage of the first reference voltage Vref1, such as 90%. More generally however, the reference voltage Vref2 386 is selected to cause the set signal $V_S$ 378 to set the flip-flop 390 when the output voltage has fallen to an unacceptable level requiring replenishment of the capacitor charge. Thus, the enable signal $V_{EN}$ 394 goes high to commence the charging mode of operation when the output voltage Vout falls to an unacceptable level and goes low to terminate the charging mode when the output voltage rises to the fully charged level, as is desirable.

Figure 11:
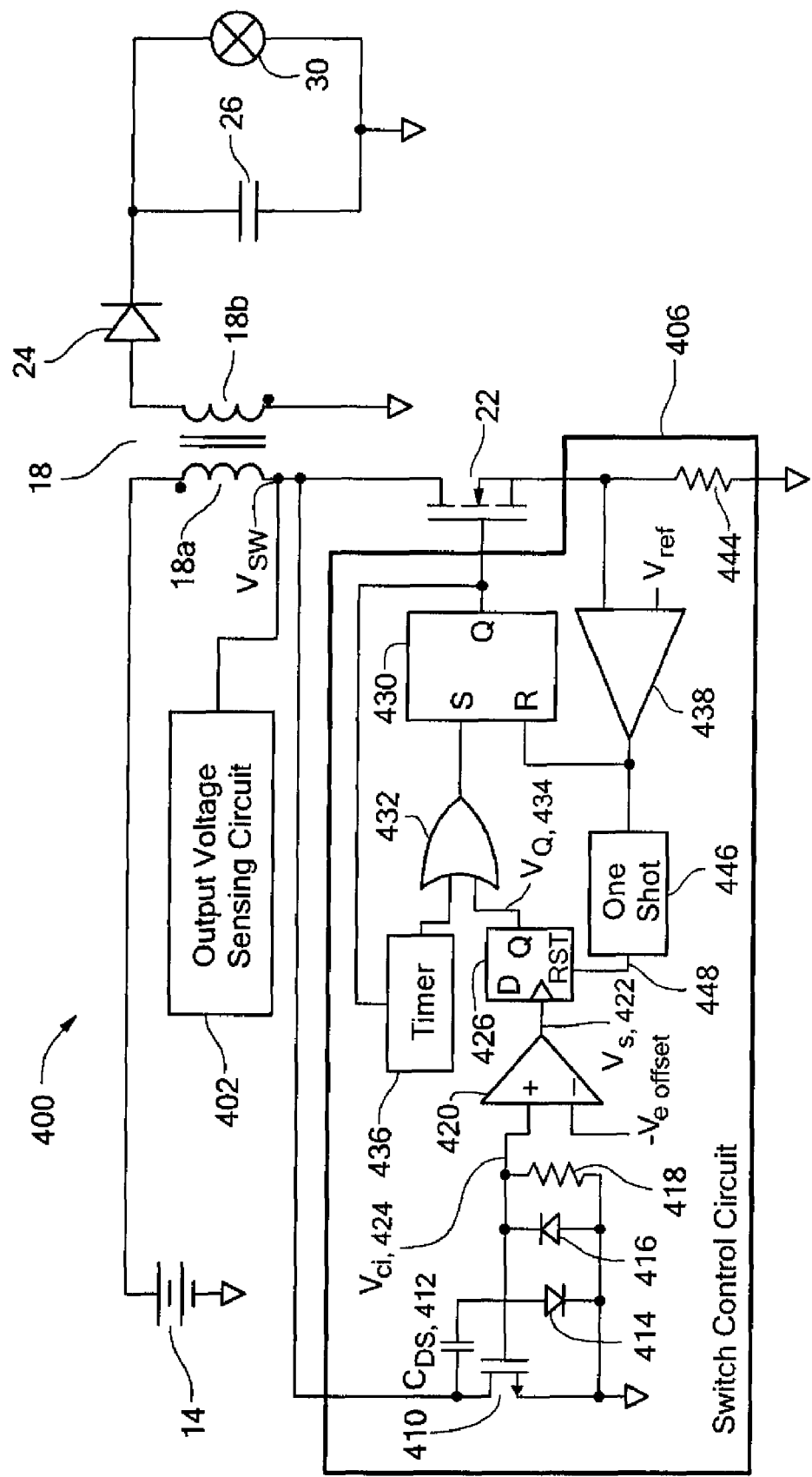
FIG. 11 is a schematic of a capacitor charging circuit including a switch control circuit implementing a gate sensing scheme according to a further aspect of the invention.

The waveforms associated with the output voltage sensing circuit 392 of FIG. 10A are substantially identical to like waveforms associated with the output voltage sensing circuit 274 of FIG. 8 as shown in FIG. 9. Referring to FIG. 11, an alternative capacitor charging circuit 400 is shown, in which like reference numbers refer to like elements. Circuit 400 thus includes input voltage source 14, transformer 18, switch 22, diode 24, and output capacitor 26. The capacitor charging circuit 400 also includes an output voltage sensing circuit 402 which may take various forms, such as those described above in connection with FIGS. 1, 3, 8, and 10 for example. The output voltage sensing circuit 402 may simply provide an indication of full capacitor charge. Additionally or alternatively, the output voltage sensing circuit 402 may implement a refresh feature in the manner of the output voltage sensing circuits 250, 274, 350, and 392 of FIGS. 7, 8, 10 and 10A, respectively.

According to an aspect of the invention, the capacitor charging circuit 400 includes a switch control circuit 406 for controlling the switch off time in response to detection of a polarity change in the slope of the switch voltage $V_{SW}$ in order to implement a zero (or at least near zero) voltage switching scheme whereby the switch 22 is turned on just as the switch voltage falls to zero volts, as is desirable to reduce switching losses. Here, the switch control circuit 406 controls the switch on time in response to the level of the current Ipri through the primary winding 18a.

A sense switch 410 has a drain terminal coupled to the drain of the switch 22 and thus, to the switch voltage $V_{SW}$, a source terminal coupled to ground, and a gate terminal at which a signal Vci 424 is provided. A capacitor 412 is shown between the drain and gate terminals of the sense switch 410. Diodes 414 and 416 and a resistor 418 are coupled between the gate terminal of the sense switch 410 and ground. The gate terminal of the sense switch 410 is coupled to an input, here the non-inverting input, of a comparator 420, as shown. A second input to the comparator 420, here the inverting input, is responsive to a small negative offset voltage −Ve, as may be on the order of −0.3 volts for example. The output of the comparator 420 provides a set input signal Vs 422 (through a D flip-flop 428 and an OR gate 432) to a flip-flop 430 that provides the switch control signal at the Q output. As will be described, generally when the set signal Vs 422 goes high, the switch 22 is turned on. It will be appreciated by those of ordinary skill in the art that while the capacitor 412 is shown as a separate component with respect to the sense switch 410, the capacitor may alternatively be provided by the inherent Miller capacitance of the switch 410.

Figure 12:
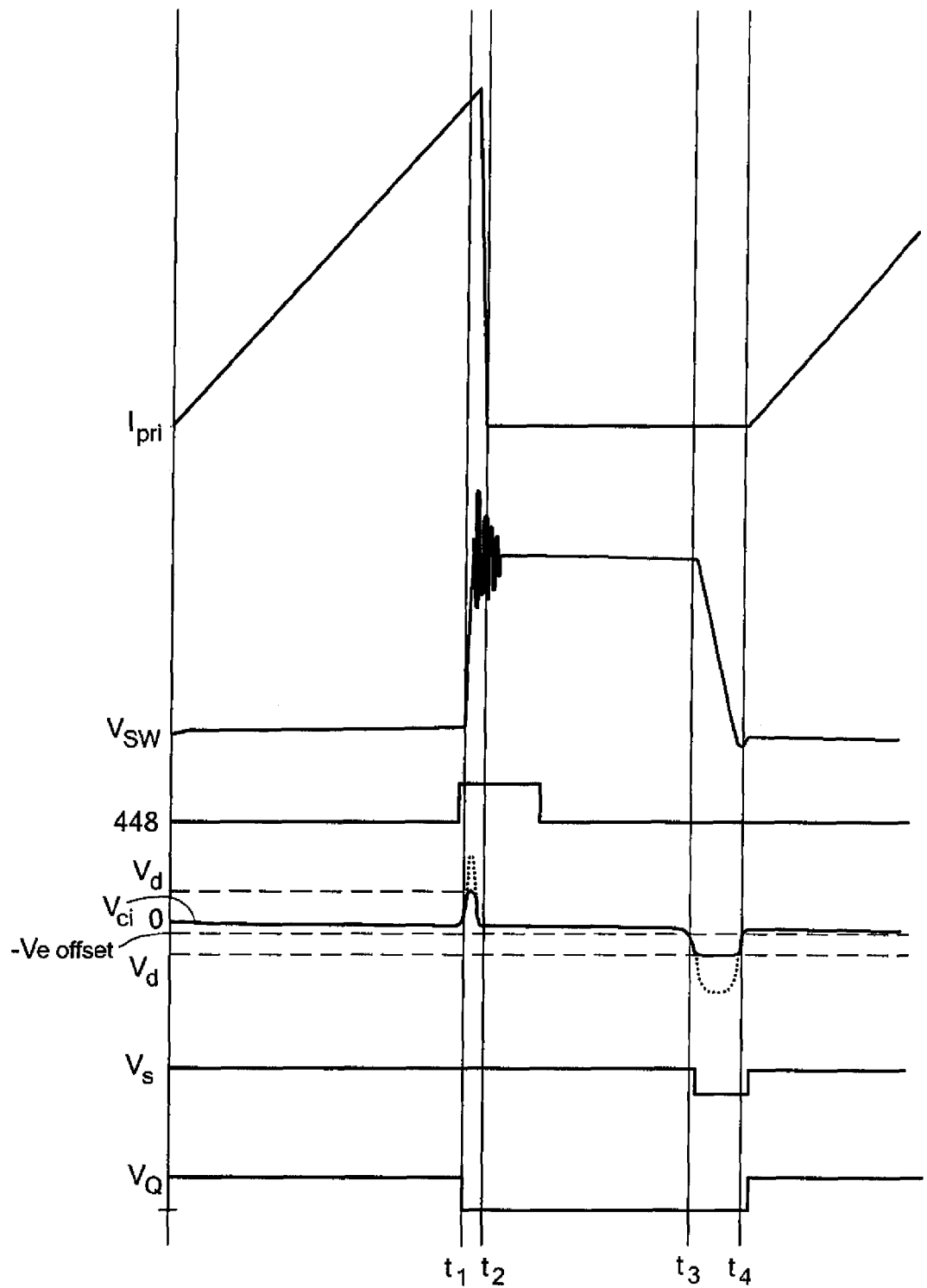
FIG. 12 shows several illustrative waveforms associated with the capacitor charging circuits of FIGS. 11, 11A and 11B.

More particularly, in operation when the switch voltage $V_{SW}$ rises or falls, the capacitor 412 is charged or discharged, respectively. The resulting comparator input voltage Vci contains positive and negative pulses corresponding to times of switch voltage increases and decreases, respectively. And when the switch voltage $V_{SW}$ is constant (i.e., has a substantially zero slope), the comparator input signal Vci is at zero volts. In the illustrative embodiment, the −Ve offset voltage is selected so that the comparator output signal Vci is high except when the slope of the switch voltage $V_{SW}$ transitions from a negative slope to a positive slope, as shown in FIG. 12.

As noted, here the switch on time is controlled in response to the primary current Ipri. To this end, a resistor 444 is coupled between the source of the switch 22 and ground and a comparator 438 has an input, here the non-inverting input, coupled to the resistor as shown. The second input, here the inverting input, to the comparator 438 is responsive to a reference voltage Vref, such that when the primary current Ipri reaches a predetermined level, as established by the reference voltage Vref, the output of comparator 438 goes high to reset the flip-flop 430 and turn off the switch 22.

A one-shot 446 is coupled between the output of comparator 438 and a reset input of a D flip-flop 428 in order to prevent the switch 22 from being turned on prematurely, as a result of voltage spikes that appear on the switch voltage $V_{SW}$ when the switch 22 is turned off. The output of comparator 420 is coupled to the clock input of the D flip-flop 428 that is responsive to a logic high voltage level on its D input. The Q output signal $V_Q$ 434 of the flip-flop 428 is coupled to a first input of an OR gate 432 that is also responsive to a timer 436. With this arrangement, the Q output of flip-flop 428 goes high when the clock signal input (i.e., the set signal Vs 422) goes high and stays high until it is reset, here on the rising edge of the reset signal 448 provided by the one-shot 446. The reset signal 448 stays high, thereby preventing the Q output of flip-flop 428 from going high for the one-shot interval. In this way, the one-shot blanks the output signal of the comparator 420 for a predetermined time following the primary current Ipri reaching the predetermined level. The one-shot interval is selected to be at least as long as the duration of the voltage spikes on the switch voltage $V_{SW}$. The OR gate 432 and timer 436 are provided to ensure that the switch 22 will not fail to turn on following power up of the circuit 400. More particularly, if a predetermined time lapses after the switch 22 is turned on, the output of the timer goes high to turn on the switch. The output of the OR gate 432 provides a set input signal to flip-flop 430 that, in turn, provides the gate drive signal for switch 22 at its Q output, as shown.

It will be appreciated by those of ordinary skill in the art that the sense switch 410 of FIG. 11 may be provided as a separate, discrete switch. Alternatively, the sense switch may be provided by one or more switches of an array forming the switch 22. In general, the sense switch 410 is of the same type as switch 22 (e.g., DMOS).

As a further alternative, the functionality of the sense switch may be provided by the switch 22 itself. Thus, in this case, a separate capacitor coupled between the drain terminal and the gate terminal of the switch 22 or the inherent Miller capacitance of the switch 22 may provide the mechanism for detecting the slope of the switch voltage $V_{SW}$ from the gate. Thus, as one example, this arrangement may be provided by eliminating the sense switch 410 and capacitor 412, coupling the gate of switch 22 to the non-inverting input of comparator 420, and providing a capacitor between the drain and gate terminals of the switch 22. In order to implement this scheme, it may be necessary to have the gate floating and clamped by the diodes. This requires special construction of the device geometry.

Figure 11A:
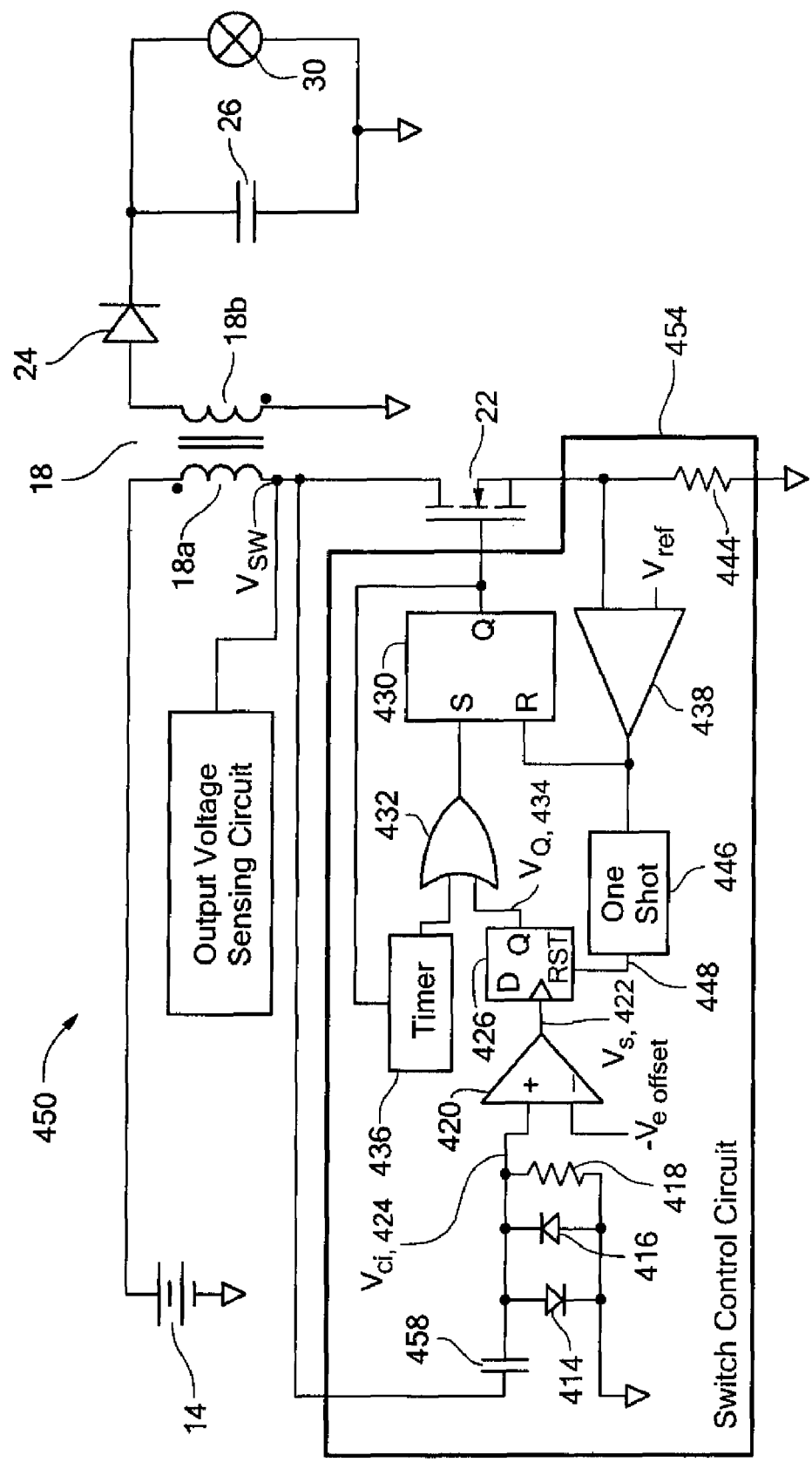
FIG. 11A is a schematic of a capacitor charging circuit including a switch control circuit implementing an alternative gate sensing circuit.

Referring also to FIG. 11A, an alternative capacitor charging circuit 450 is shown in which like reference numbers refer to like elements. Circuit 450 thus includes input voltage source 14, transformer 18, switch 22, diode 24, and output capacitor 26. Circuit 450 further includes an alternative switch control circuit 454. Like the switch control circuit 406 of FIG. 11, switch control circuit 454 controls the switch off time in response to detection of a polarity change in the slope of the switch voltage $V_{SW}$ in order to implement a zero (or at least near zero) voltage switching scheme whereby the switch 22 is turned on just as the switch voltage falls to zero volts, as is desirable to reduce switching losses. Here again, the switch control circuit 454 controls the switch on time in response to the level of the current Ipri through the primary winding 18a.

The switch control circuit 454 is similar to switch control circuit 406 of FIG. 11 with the exception that the sense switch 410 is eliminated and capacitor 458 is a discrete capacitor, rather than the Miller or Cgd capacitance inherent in the DMOS device geometry. The capacitor 458 must be capable of withstanding the high switch voltage $V_{SW}$. In one illustrative embodiment, in which the output voltage is on the order of 315 volts and the transformer turns ratio is ten, the capacitor 458 must stand off at least 31.5 volts with margin for tolerances and voltage switching spikes. In this embodiment, the capacitor 458 is rated for 80 volts; whereas the technology's gate oxide is only rated for 8 volts. Thus, capacitor 458 has a first terminal coupled to the drain of the switch 22 and thus, to the switch voltage $V_{SW}$, and a second terminal at which the signal Vci 424 is provided at an input, here the non-inverting input, of comparator 420. Diodes 414 and 416 and resistor 418 are coupled between the capacitor 458 and ground. A second input to the comparator 420, here the inverting input, is responsive to a small negative offset voltage –Ve, as may be on the order of –0.3 volts for example. The output of the comparator 420 provides a set input signal Vs 422 (through a D flip-flop 428 and an OR gate 432) to a flip-flop 430 that provides the switch control signal at the Q output. As will be described, generally when the set signal Vs 422 goes high, the switch 22 is turned on.

In operation when the switch voltage $V_{SW}$ rises or falls, the capacitor 458 is charged or discharged, respectively. The resulting comparator input voltage Vci contains positive and negative pulses corresponding to times of switch voltage increases and decreases, respectively. And when the switch voltage $V_{SW}$ is constant (i.e., has a substantially zero slope), the comparator input signal Vci is at zero volts. In the illustrative embodiment, the –Ve offset voltage is selected so that the comparator output signal Vci is high except when the slope of the switch voltage $V_{SW}$ transitions from a negative slope to a positive slope, as shown in FIG. 12.

As in FIG. 11, resistor 444 and comparator 438 are provided to sense the primary current level so that when the primary current Ipri reaches a predetermined level, as established by the reference voltage Vref, the output of comparator 438 goes high to reset the flip-flop 430 and turn off the switch 22. One-shot 446 coupled between the output of comparator 438 and a reset input of a D flip-flop 428 prevents the switch 22 from being turned on prematurely, as a result of voltage spikes that appear on the switch voltage $V_{SW}$ when the switch 22 is turned off. The output of comparator 420 is coupled to the clock input of the D flip-flop 428 that is responsive to a logic high voltage level on its D input. The Q output signal $V_Q$ 434 of the flip-flop 428 is coupled to a first input of an OR gate 432 that is also responsive to a timer 436. With this arrangement, as described above, the one-shot blanks the output signal of the comparator 420 for a predetermined time following the primary current Ipri reaching the predetermined level. The OR gate 432 and timer 436 are provided to ensure that the switch 22 will not fail to turn on following power up of the circuit 400 as is also described above. The output of the OR gate 432 provides a set input signal to flip-flop 430 that, in turn, provides the gate drive signal for switch 22 at its Q output, as shown.

A further alternative capacitor charging circuit 460 is shown in which like reference numbers refer to like elements. Like the switch control circuit 406 of FIG. 11 and the switch control circuit 454 of FIG. 11A, switch control circuit 464 controls the switch off time in response to detection of a polarity change in the slope of the switch voltage $V_{SW}$ in order to implement a zero (or at least near zero) voltage switching scheme whereby the switch 22 is turned on just as the switch voltage falls to zero volts, as is desirable to reduce switching losses. Here again, the switch control circuit 464 controls the switch on time in response to the level of the current Ipri through the primary winding 18*a*.

The switch control circuit 464 is similar to switch control circuit 454 of FIG. 11A with the exception that the diodes 414 and 416 are eliminated. The significance of removing the diodes is described in connection with the waveforms of FIG. 12. In all other respects, the circuit of FIG. 11A is like the circuit of FIG. 11.

Figure 11B:
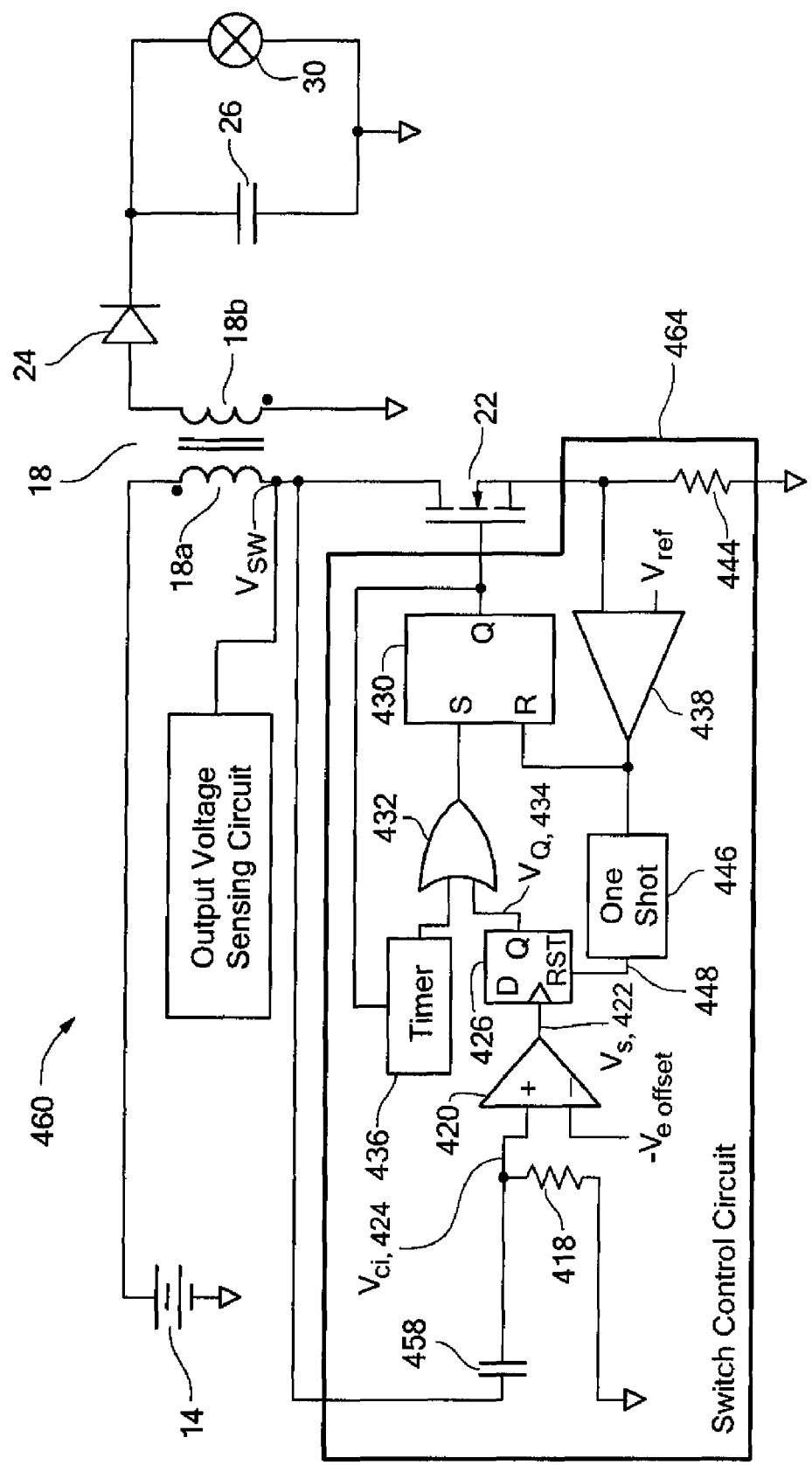
FIG. 11B is a schematic of a capacitor charging circuit including a switch control circuit implementing an further alternative gate sensing circuit.

Referring also to FIG. 12, illustrative waveforms associated with the switch control circuits 406, 454, and 464 of FIGS. 11, 11A and 11B, respectively, are shown. Specifically, the switch voltage $V_{SW}$ and the primary current Ipri are shown during a switch cycle. During the switch on time, the primary current Ipri ramps up. At a time t1, the primary current exceeds a predetermined level, causing the output of comparator 438 to go high to reset the flip-flop 430 and turn off the switch 22. The output of comparator 438 going high also triggers the one-shot 446, causing the output signal $V_Q$ 434 of the flip-flop 428 remain low for at least the blanking interval.

Once the switch 22 is turned off, the switch voltage $V_{SW}$ rises, between times t1 and t2. During this interval, the capacitor, such as capacitor 412 of FIG. 11 or capacitor 458 of FIGS. 11A and 11B, is charged, causing the comparator input signal Vci 424 to rise. In the circuit 400 of FIG. 11 and circuit 450 of FIG. 11A, the comparator input signal Vci 424 rises to the level of a positive clamp voltage Vd associated with the diode 414; whereas in the circuit 460 of FIG. 11B, the comparator input signal Vci 424 rises to a higher level (indicated by dotted lines) since the clamping diodes are eliminated. As the slope of the switch voltage $V_{SW}$ tapers to zero at time t2, the signal Vci falls to zero volts.

At a time t3, the switch voltage $V_{SW}$ begins to fall since the secondary current (not shown) has fallen to zero amps. The switch voltage $V_{SW}$ continues to fall until slightly before a time t4 when it changes polarity due to the reverse recovery of the diode 24. As the switch voltage $V_{SW}$ begins to fall, the capacitor, such as capacitor 412 of FIG. 11 or capacitor 458 of FIGS. 11A and 11B, is discharged, thereby causing the comparator input signal Vci 424 to go negative. In the circuit 400 of FIG. 11 and circuit 450 of FIG. 11A, the comparator input signal Vci 424 falls to the level of a negative clamp voltage –Vd associated with the diode 416; whereas in the circuit 460 of FIG. 11B, the comparator input signal Vci 424 falls to a lower level (indicated by dotted lines) since the clamping diodes are eliminated. The input signal Vci 424 stays negative until a time t4, when the switch voltage slope returns to zero, causing the signal Vci to return to zero volts.

Since the comparator 420 compares the input signal Vci 424 to the –Ve offset signal, the comparator output signal Vs 422 remains high until slightly after time t3, when the input signal Vci falls to below the –Ve offset signal. Thereafter, the comparator output signal Vs remains low until slightly after time t4, when the input signal Vci exceeds the –Ve offset signal, as shown.

The Q output $V_Q$ 434 of flip-flop 428 is reset by the blanking signal 448 at time t1. The output of flip-flop 428 remains low until the $V_S$ signal goes high at about time t4, as shown. Once the Q output $V_Q$ of flip-flop 428 goes high, the output of OR gate 432 goes high, thereby setting the flip-flop 430 and causing the switch 22 to be turned on to start the next switch cycle.

It will be appreciated by those of ordinary skill in the art that the switch control circuit 406 is particularly advantageous in applications in which the switch voltage $V_{SW}$ does not reach zero volts before it starts to climb. This is because detection of a change in slope polarity eliminates the need for voltage comparison to any particular voltage level.

It will also be appreciated that while the inventive circuits and techniques are described herein in connection with a capacitor charging circuit, such circuits and techniques can be used in converters for various other applications.

Having described the preferred embodiments of the invention, it will now become apparent to one of ordinary skill in the art that other embodiments incorporating their concepts may be used.

For example, it will be appreciated by those of ordinary skill in the art that the different inventive features described herein may be combined for use in a capacitor charging circuit or alternatively, may be used selectively and individually. For example, the output voltage sensing circuits 40, 110, and 144 of FIGS. 1, 2, and 3, respectively, may be used alone in otherwise conventional capacitor charging circuits or alternatively, may be used in a charging circuit that also incorporates other inventive concepts discussed herein, such those discussed in conjunction with FIGS. 4-6.

It will also be appreciated that while particular circuit elements and even logic signal levels have been described in order to explain the inventive concepts, the embodiments of the invention should not be limited to the disclosed embodiments, but rather should be limited only by the spirit and scope of the appended claims,

What is claimed is:

1. A flyback converter comprising:
   a transformer having a primary winding and a secondary winding;
   a switch having a terminal coupled to the primary winding; and
   a switch control circuit having a first circuit portion for controlling the on time of the switch and a second circuit portion for controlling the off time of the switch, wherein the second circuit portion comprises a slope detection circuit to detect a change of the slope of the voltage at the switch terminal from a negative slope, wherein the slope detection circuit comprises:
      a capacitor having a first terminal coupled to the switch terminal and a second terminal;
      a resistor coupled to the second terminal of the capacitor; and
      a comparator coupled to the second terminal of the capacitor and providing a comparator output signal that transitions from a first logic level to a second logic level when the slope of the voltage at the switch terminal changes from a negative slope.

2. The converter of claim 1 wherein the slope detection circuit further comprises:
   a sensing switch coupled to the switch terminal and having a control terminal coupled to the second terminal of the capacitor; and
   a clamp coupled to the control terminal.

3. The converter of claim 2 wherein the switch is comprised of a plurality of switches and wherein the sensing switch is one of the plurality of switches.

4. The converter of claim 1 further comprising a clamp coupled between the second terminal of the capacitor and ground.

5. The converter of claim 1 further comprising a flip-flop having a set input responsive to the comparator output signal and an output at which a switch control signal is provided, wherein the second circuit portion of the switch control circuit comprises:

a second resistor coupled to the switch; and
a second comparator having a first input coupled to the second resistor, a second input responsive to a reference voltage, and providing an output signal to a reset input of the flip-flop.

6. In a flyback converter having a transformer with a primary winding coupled to a terminal of a switch and a secondary winding, a method comprising:
   detecting of a change in the slope of a voltage at the terminal of the switch from a negative slope; and turning the switch on in response to the detection, wherein detecting comprises:
      providing a capacitor having a first terminal coupled to the switch terminal and having a second terminal;
      providing a resistor coupled to the second terminal of the capacitor; and
      comparing the voltage at the second terminal of the capacitor to a reference voltage to detect a change in the slope of the voltage at the switch terminal from a negative slope.

7. The method of claim 6 wherein detecting further comprises:
   providing a sense switch having a first terminal coupled to the switch terminal and having a second, control terminal, coupled to the second terminal of the capacitor; and
   clamping the voltage at the control terminal.

8. The method of claim 6 further comprising clamping the voltage at the second terminal of the capacitor.

9. The method of claim 6 further comprising:
   measuring a current in the primary winding to determine when the primary winding current exceeds a predetermined level; and
   turning the switch off in response to the determination.

10. A flyback converter comprising:
   a transformer having a primary winding and a secondary winding;
   a switch having a terminal coupled to the primary winding; and
   a switch control circuit having a first circuit portion for controlling the on time of the switch and a second circuit portion for controlling the off time of the switch, wherein the second circuit portion comprises a slope detection circuit to detect a change of the slope of the voltage at the switch terminal from a negative slope, wherein the slope detection circuit comprises:
      a sensing switch coupled to the switch terminal and having a control terminal;
      a clamp coupled to the control terminal;
      a resistor coupled to the control terminal; and
      a comparator coupled to the control terminal and providing a comparator output signal that transitions from a first logic level to a second logic level when the slope of the voltage at the switch terminal changes from a negative slope.

11. The converter of claim 10 wherein the switch is comprised of a plurality of switches and wherein the sensing switch is one of the plurality of switches.

* * * * *

UNITED STATES PATENT AND TRADEMARK OFFICE
CERTIFICATE OF CORRECTION

| | | |
|---|---|---|
| PATENT NO. | : 7,787,262 B2 | Page 1 of 1 |
| APPLICATION NO. | : 11/612564 | |
| DATED | : August 31, 2010 | |
| INVENTOR(S) | : Vijay Mangtani et al. | |

It is certified that error appears in the above-identified patent and that said Letters Patent is hereby corrected as shown below:

Col. 1, line 8, in the "CROSS-REFERENCE TO RELATED APPLICATIONS" section after 2005, insert --now issued as U.S. Pat. No. 7,646,616 on January 12, 2010--.

Col. 1, line 55, delete "in" and replace with --is--.

Col. 4, line 16, delete "an" and replace with --a--.

Col. 9, lines 1-2, delete "and a" and replace with --a--.

Col. 11, line 38, delete ". when" and replace with --. When--.

Col. 12, line 30, delete "loop" and replace with --loops--.

Col. 13, line 31, delete "are" and replace with --is--.

Col. 16, line 1, delete "often," and replace with --of ten,--.

Col. 16, line 5, delete "form an" and replace with --form of an--.

Col. 16, line 18, delete "288 or" and replace with --288--.

Col. 24, line 17, delete "flip-flop 428 remain" and replace with --flip-flop 428 to remain--.

Col. 25, line 15, delete ", such those" and replace with --, such as those--.

Signed and Sealed this
Fifteenth Day of February, 2011

David J. Kappos
*Director of the United States Patent and Trademark Office*